(12) United States Patent
Burton et al.

(10) Patent No.: US 10,039,969 B2
(45) Date of Patent: Aug. 7, 2018

(54) PERFORMANCE METRICS

(71) Applicant: AvidaSports, LLC., Harper Woods, MI (US)

(72) Inventors: Bruce J. Burton, Grosse Pointe Farms, MI (US); John Videtich, Holland, MI (US); Warren Guthrie, West Olive, MI (US); Ryan Johnson, Grand Haven, MI (US); Paul Duckworth, Holland, MI (US)

(73) Assignee: AvidaSports, LLC, Harper Woods, MI (US)

( * ) Notice: Subject to any disclaimer, the term of this patent is extended or adjusted under 35 U.S.C. 154(b) by 536 days.

(21) Appl. No.: 14/665,980

(22) Filed: Mar. 23, 2015

(65) Prior Publication Data

US 2015/0196827 A1     Jul. 16, 2015

Related U.S. Application Data

(63) Continuation of application No. 12/971,961, filed on Dec. 17, 2010, now Pat. No. 8,988,240, which is a continuation-in-part of application No. 12/657,217, filed on Jan. 15, 2010, now Pat. No. 8,330,611.

(60) Provisional application No. 61/424,439, filed on Dec. 17, 2010, provisional application No. 61/205,146, filed on Jan. 15, 2009, provisional application No. 61/287,361, filed on Dec. 17, 2009.

(51) Int. Cl.
| | |
|---|---|
| *G08B 21/00* | (2006.01) |
| *A63B 71/06* | (2006.01) |
| *A63B 24/00* | (2006.01) |
| *G06K 9/00* | (2006.01) |
| *G01C 23/00* | (2006.01) |
| *H04N 7/18* | (2006.01) |

(52) U.S. Cl.
CPC ...... *A63B 71/0616* (2013.01); *A63B 24/0062* (2013.01); *G01C 23/00* (2013.01); *G06K 9/00342* (2013.01); *G06K 9/00355* (2013.01); *H04N 7/181* (2013.01); *A63B 2220/12* (2013.01); *A63B 2220/40* (2013.01); *A63B 2220/806* (2013.01); *A63B 2225/50* (2013.01); *A63B 2244/20* (2013.01)

(58) Field of Classification Search
CPC ........ G06K 9/00342; G06K 9/52; G06K 9/00; H04N 5/765; H04N 5/2252; H04N 5/44; G06T 7/0042; G06T 7/20; G06T 7/60
USPC ..... 340/686.1, 573.1, 572.1, 539.13, 539.11; 382/103, 190, 115; 348/157, 156, 159, 348/564
See application file for complete search history.

(56) References Cited

U.S. PATENT DOCUMENTS 5,864,518 A * 1/1999 Geiser ................ A63B 71/0686
                                                                   368/10
7,602,301 B1 * 10/2009 Stirling ................ A61B 5/1127
                                                                   340/573.1

(Continued)

*Primary Examiner* — Hoi Lau
(74) *Attorney, Agent, or Firm* — Great Lakes Intellectual Property, PLLC

(57) ABSTRACT

A method and system relates to locating or otherwise generating positional information for an object, such as but not limited generating positional coordinates for an object attached to an athlete engaging in an athletic event. The positional coordinates may be processed with other telemetry and biometrical information to provide real-time performance metrics while the athlete engages in the athletic event.

16 Claims, 13 Drawing Sheets

(56) References Cited

U.S. PATENT DOCUMENTS

| | | | | |
|---|---|---|---|---|
| 8,330,611 B1* | 12/2012 | Burton | G06K 9/00362 340/539.11 |
| 8,786,456 B2* | 7/2014 | Burton | G06K 9/00362 340/539.11 |
| 8,988,240 B2* | 3/2015 | Burton | A63B 24/0062 340/539.11 |
| 9,195,885 B2* | 11/2015 | Burton | G06K 9/00362 |
| 9,483,930 B1* | 11/2016 | Haaland | G08B 21/245 |
| 9,524,632 B2* | 12/2016 | Moore | G08B 21/245 |
| 2002/0013535 A1* | 1/2002 | Nissila | G04G 17/08 600/519 |
| 2003/0138763 A1* | 7/2003 | Roncalez | A63B 24/0003 434/254 |
| 2007/0293374 A1* | 12/2007 | Chan | A63B 71/0686 482/55 |
| 2008/0214360 A1* | 9/2008 | Stirling | A61B 5/1038 482/9 |
| 2009/0047645 A1* | 2/2009 | Dibenedetto | G06F 19/3418 434/258 |
| 2009/0048070 A1* | 2/2009 | Vincent | A63B 24/0021 482/8 |
| 2009/0239710 A1* | 9/2009 | Shemesh | A61B 5/11 482/8 |
| 2010/0204952 A1* | 8/2010 | Irlam | A61B 5/11 702/141 |
| 2010/0210975 A1* | 8/2010 | Anthony | A61B 5/0002 600/595 |
| 2011/0153042 A1* | 6/2011 | Burton | A63B 24/0062 700/91 |
| 2013/0094710 A1* | 4/2013 | Burton | G06K 9/00362 382/103 |
| 2014/0031703 A1* | 1/2014 | Rayner | A61B 5/02055 600/484 |
| 2014/0228649 A1* | 8/2014 | Rayner | A61B 5/1118 600/301 |
| 2014/0277628 A1* | 9/2014 | Nieminen | G06K 9/00342 700/91 |
| 2014/0328515 A1* | 11/2014 | Burton | G06K 9/00362 382/103 |
| 2015/0196827 A1* | 7/2015 | Burton | A63B 24/0062 702/182 |
| 2016/0217324 A1* | 7/2016 | Burton | G06K 9/00342 |
| 2017/0333752 A1* | 11/2017 | Korkala | A63B 24/0062 |

\* cited by examiner

Fig. 3

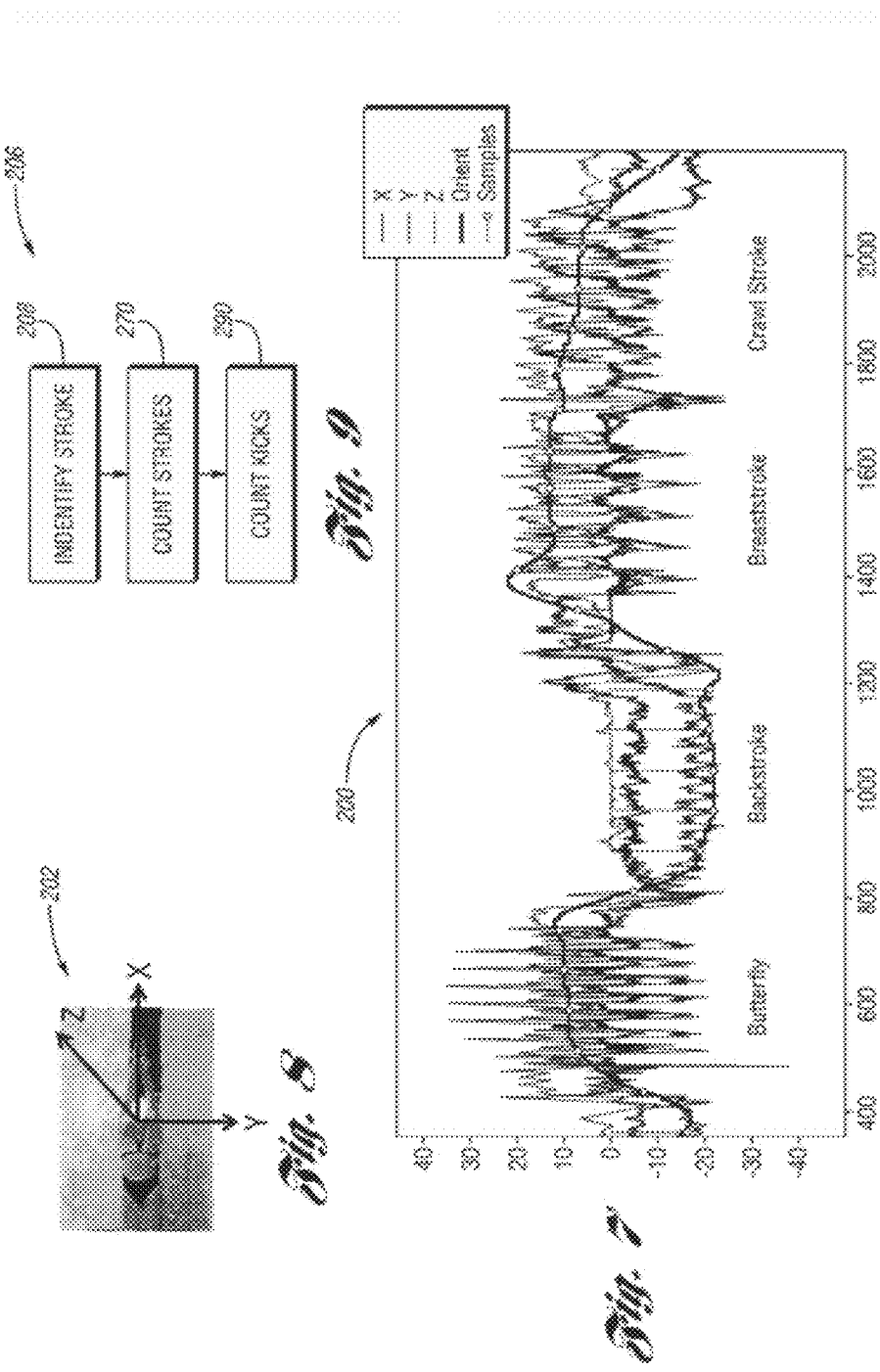

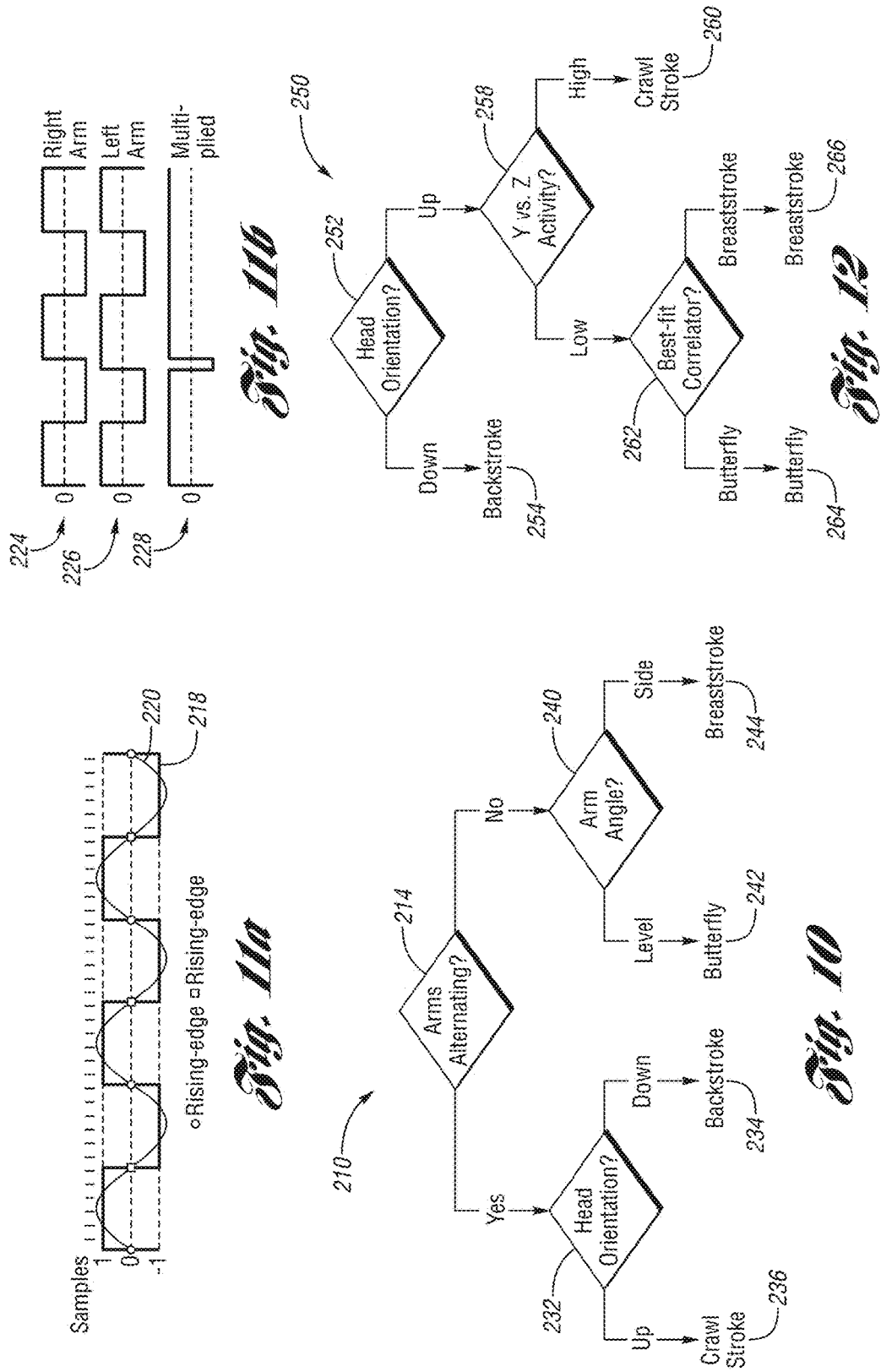

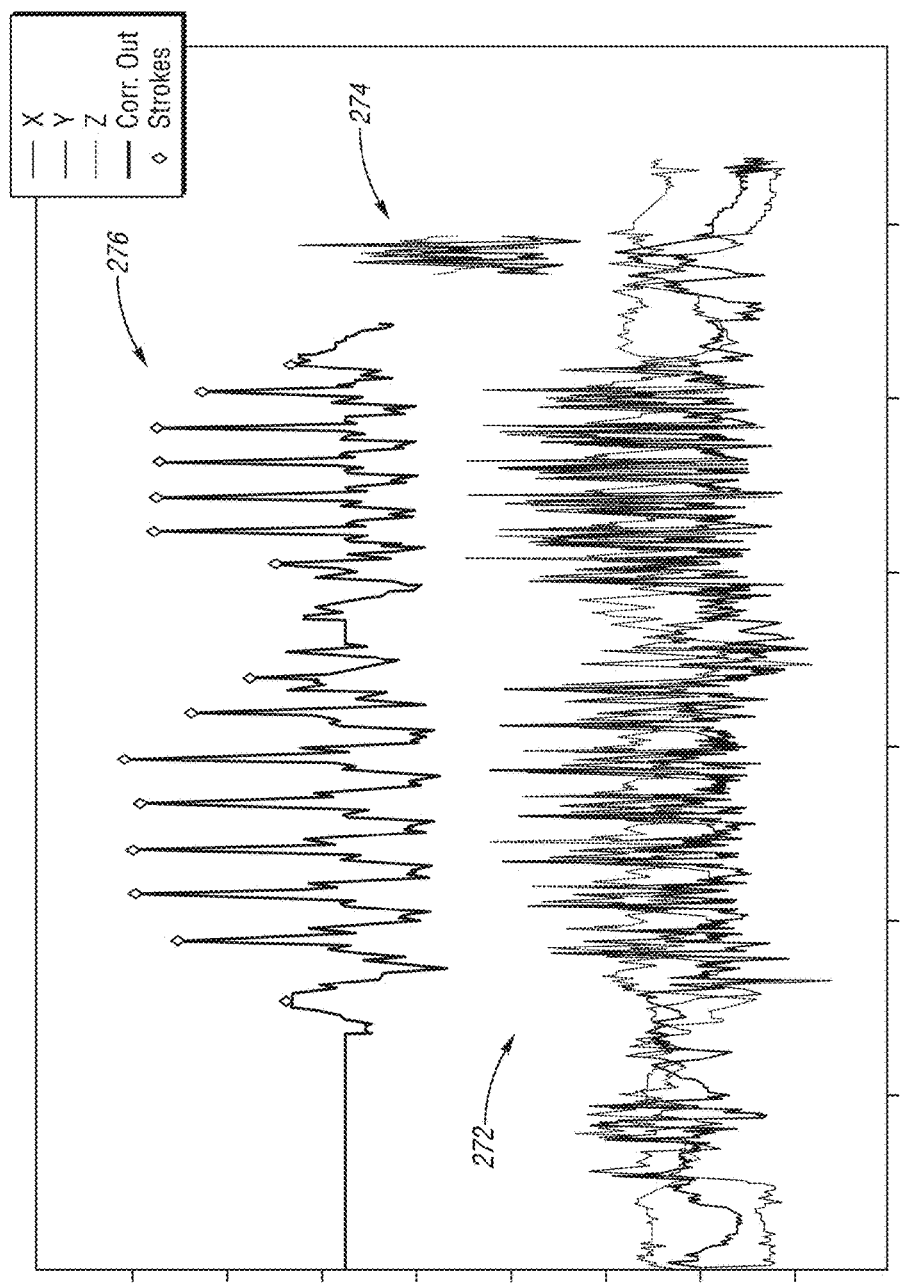

PERFORMANCE METRICS

CROSS-REFERENCE TO RELATED APPLICATIONS

This application is a continuation of U.S. application Ser. No. 12/971,961 filed Dec. 17, 2010, now U.S. Pat. No. 8,988,240, claims the benefit of U.S. provisional application 61/424,439 filed Dec. 17, 2010, entitled "Performance Metrics" and which is a continuation-in-part of U.S. application Ser. No. 12/657,217 filed Jan. 15, 2010, now U.S. Pat. No. 8,330,611 entitled "Positional Locating System and Method", which, in turn, claims the benefit of U.S. provisional application Ser. No. 61/205,146 filed Jan. 15, 2009, entitled "Method and System of Object Tracking and Telemetry", and U.S. provisional application Ser. No. 61/287,361 filed Dec. 17, 2009, entitled "Method and System of Object Tracking and Telemetry". The disclosures of which are incorporated in their entirety by reference herein.

BACKGROUND OF THE INVENTION

1. Technical Field

The present invention relates to systems and methods of positionally locating moving objects and real-time generation of telemetry and performance metrics for the moving objects.

2. Background Art

Global positioning system (GPS) can be used to positionally locate a moving object. GPS relies on a GPS enabled device attached to the object to calculate positional coordinates based on information transmitted from orbiting satellites. The reliance on orbiting satellites can be problematic while the moving object is within a covered area since the GPS enabled device may not receive the signals necessary to perform its coordinate calculations.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 3 illustrates performance telemetry in accordance with one non-limiting aspect of the present invention;

FIG. 7 illustrates an exemplary set of accelerometer data in accordance with one non-limiting aspect of the present invention;

FIG. 8 illustrates a coordinate system used in accordance with one non-limiting aspect of the present invention;

FIG. 9 illustrates a flowchart of a method for generating performance metrics in accordance with one non-limiting aspect of the present invention;

FIG. 10 illustrates a flowchart for stroke identification in accordance with one non-limiting aspect of the present invention;

FIGS. 11a-11b illustrate one such comparison process as contemplated by one non-limiting aspect of the present invention;

FIG. 12 illustrates a flowchart for stroke identification in accordance with one non-limiting aspect of the present invention;

FIG. 13 illustrates a graph of accelerometer data in accordance with one non-limiting aspect of the present invention;

DETAILED DESCRIPTION OF THE PREFERRED EMBODIMENT(S)

Figure 1:
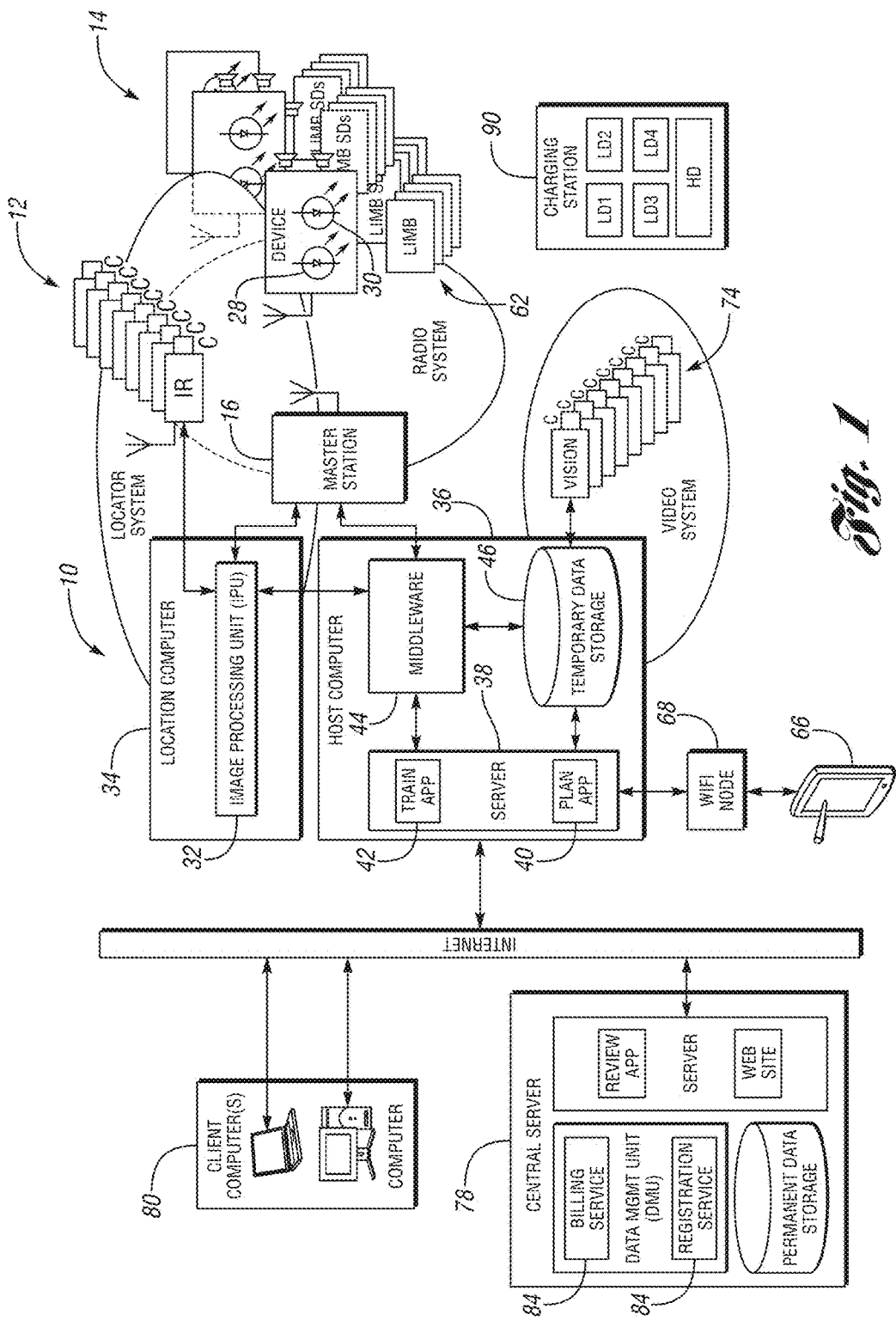
FIG. 1 illustrates a locating system in accordance with one non-limiting aspect of the present invention.

FIG. 1 illustrates a locating system 10 in accordance with one non-limiting aspect of the present invention. The system 10 may include on one or more cameras 12 to facilitate locating one or more devices 14 as the devices 14 travel within an area covered by the cameras 12. The description set forth below is predominately described with respect to the cameras 12 being positioned around a swimming pool in order to facilitate locating the devices 14 while the devices 14 are being worn by swimmers swimming within the swimming pool. In this example, the devices 14 are referred to as head devices 14 and a master station 16 may be configured to facilitate control of the head devices while the cameras 12 capture related images in order to determine a position of the swimmers with the swimming pool. The position of each swimmer can be calculated from a spatial reduction of the signals captured within the images to particular positions within the pool.

Figure 2:
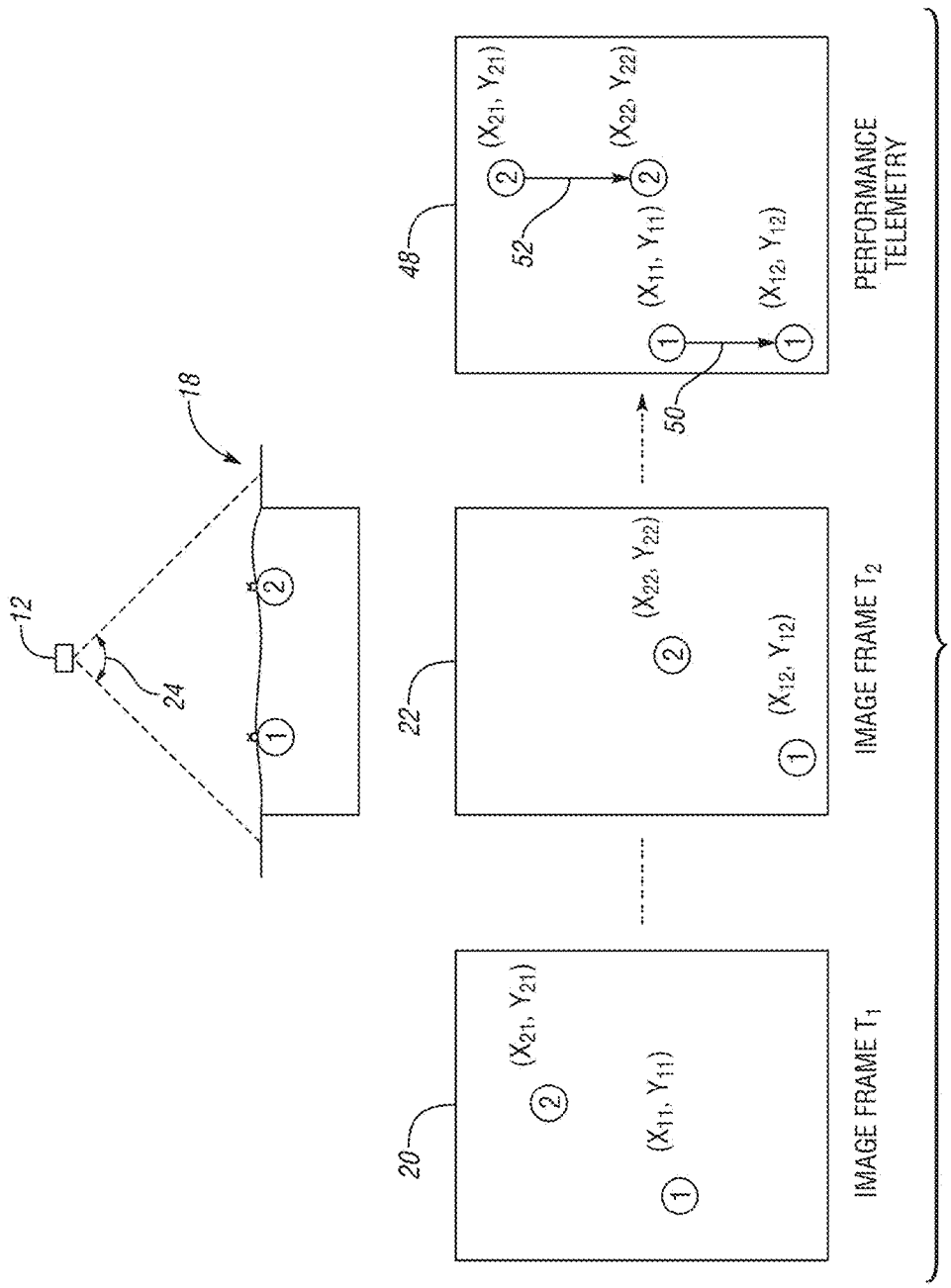
FIG. 2 illustrates spatial reduction in accordance with one non-limiting aspect of the present invention.

FIG. 2 schematically illustrates one example of the spatial reduction technique contemplated by the present invention where one of the cameras 12 may be positioned relative to a swimming pool 18 to capture image frames 20, 22 of events taking place within its viewing angle 24. While the present invention fully contemplates the image frames 20, 22 including visual and/or non-visual representations of any captured signals, the images frames shown in FIG. 2 represent images frames 20, 22 captured with an infrared (IR) camera 12 configured to capture IR or other non-visible representations of signals emitted from one or more beacons 28, 30 included on head devices 14 of on a first and second swimmer (1, 2) that happen to be swimming in the area covered by the camera's viewing angle 24 at a first time (T1) and second time (T2). The camera 12 may include a filter or other configuration particularly suited to capturing the signals emitted from the beacons 28, 30.

The first image frame 20 captured at time T1 and the second image frame 22 captured are time T2 are shown to be of the type where the camera 12 was configured to filter signals other than those that correspond with the beacons 20, 22. The captured signals are shown with circular representations for exemplary purposes only. Depending on the resolution of the camera 12, the wavelength and strength of the signal may exhibit some other pattern or representation within one or more of pixels (not shown) of the image frames 20, 22. A pixel-by-pixel analysis of the image frames 20, 22 may be performed with an image processing element 32 (see FIG. 1) of the master station 16 to identify the pixels that represents receipt of the strongest signal. Depending on the positioning of the camera 12 at the time the image frames 20, 22 were captured, each of the pixels can be associated with a particular area within the viewing angle 24, i.e., to a particular location/position within the pool 18. The pixel having the strongest signal can act as a center for coordinate generation purposes.

The arrangement shown in FIG. 2 includes the camera 12 being set a fixed position above the swimming pool 18 in order to simplify the spatial reduction of the images captured within the image frames 20, 22 to particular areas in the pool 18. Since the position of the camera 12 is known and fixed, a limited number of calculations are need to associate each pixel of the image frames 20, 22 with a known portion of the swimming pool 18. This example, however, is not intended to limit the scope and contemplation of the present invention. The present invention fully contemplates the camera 12 moving such that additional processing may be required to fix the position of the camera 12 at the time of image capture before the areas associated with each image pixel could be identified with a particular area of the swimming pool 18.

Each of the pixels chosen to be representing the center of the emitted signals may be associated with an X-axis and Y-axis coordinate value according to an identity of the swimmer (shown as swimmer #1 and swimmer #2) and a timestamp representative of a time at which each image frame was taken (shown as timestamp #1 and timestamp #2). Using this methodology, a coordinate value (XST, YST) can be assigned to a location of each swimmer within the captured image frames 20, 22 where X identifies a position along the X-axis, Y identifies a position along the Y-axis, S identifies the swimmer, and T identifies the timestamp. This image-based coordinate may be defined relative a positioning of the camera 12 capturing the associated image and may be sufficient to determine a location from a single image, as opposed to having to take multiple pictures before fixing the location. In some cases, multiple cameras 12 may be used to capture images of different and/or overlapping portions of the pool. The resulting image-based coordinates may be defined locally to that associated camera 12 and thereafter the spatial relationship of one or more the cameras 12 may be used reduce the image-based coordinates into some other coordinated system and/or to check the relative accuracy/precision of the other coordinates.

A location computer 34 may be configured to host the image process unit 32 and to output the image-based coordinate values as raw representations of the swimmer's location within the images 20, 22 and/or the image processing unit 32 may be configured to convert or otherwise process the image coordinates into world coordinates, global position system (GPS) coordinates, and/or some other coordinate orientation that has an absolute coordinate other than the camera or pool 18. The coordinate information may then be communicated to a host computer 36 for further processing. The host computer 36 may include a server 38 to host a planning application 40 and a training application 42 along with middleware 44 and temporary data storage 46 to facilitate interaction with other elements of the system 10 and to otherwise supporting data and processing demands necessary to supporting the operations contemplated herein.

The train application 42 may be a tool that tracks and otherwise processes telemetry information for the swimmers based at least in part on the coordinate information output from the location computer 34. FIG. 2 illustrates a performance telemetry image frame 48 to illustrate how some of the metrics contemplated by the present invention may be calculated based on the coordinate values, such at but not limited to distance traveled and speed. The performance telemetry image frame 48 can be used as a superimposition of two or more of the image frames 20, 22 where movement of the swimmers between images frames can be graphically illustrated with a first reference vector 50 and a second reference vector 52. The length of the vectors 50, 52 can be used to represent distance traveled which can then be used to calculate speed according to a time elapsed between the first and second timestamps.

Figure 3:
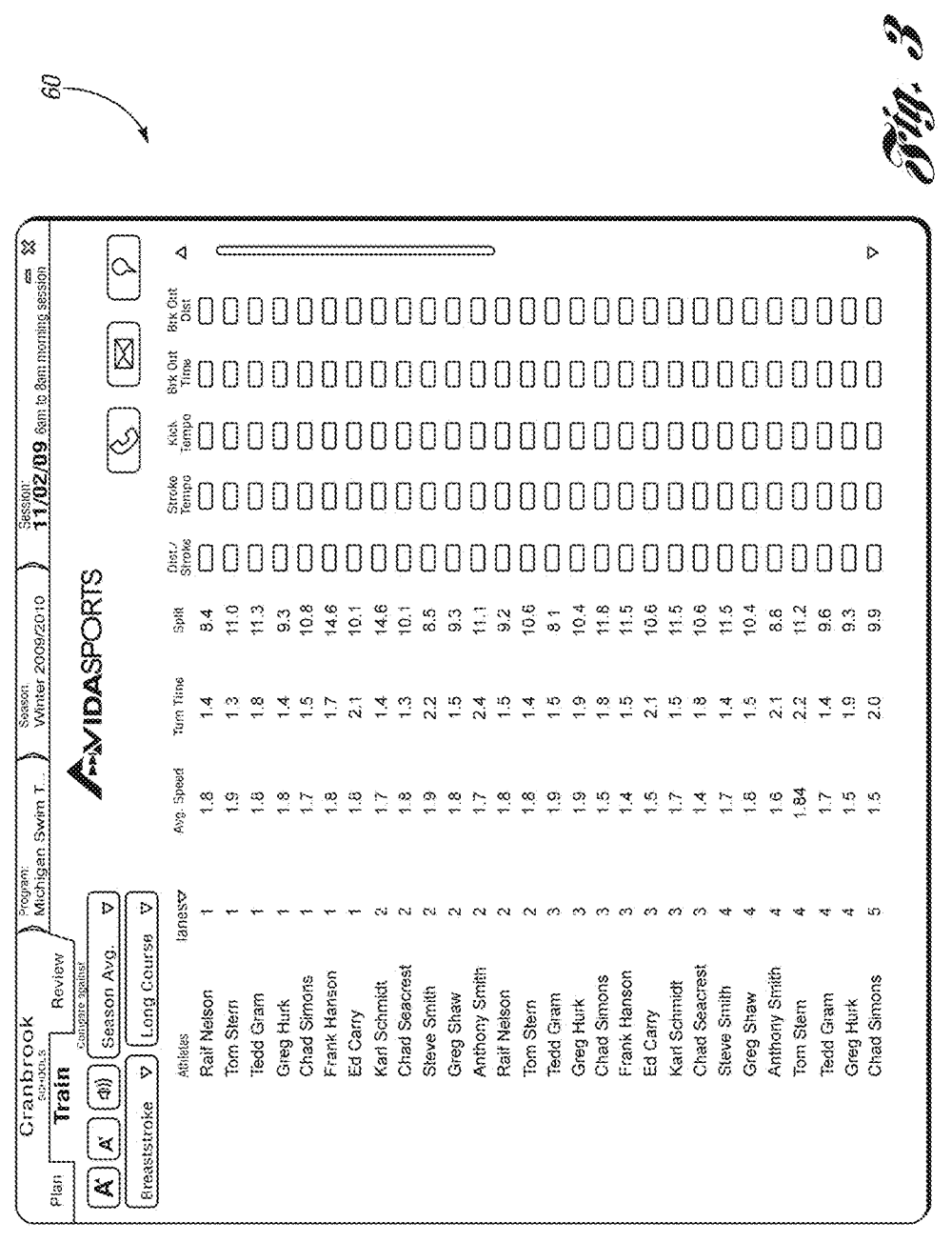

The exemplary illustration of distance and speed is not intended to limit the scope and contemplation of the present invention as the present invention fully contemplates including the coordinated representations in any type of a calculation, particularly calculations that are specified to the actions and movements of element being tracked with the device 14. FIG. 3 illustrates a display 60 of exemplary performance metrics that may be generated based at least in part on the coordinate values. In some cases, the performance telemetry may be based in part on additional information collected from the swimmers, such as based on information collected from limb devices 62 attached to arms and legs of the swimmers (see FIG. 1). The limb devices 62 may be include accelerometers or other devices configured to monitor and report movements of the swimmer to the master station 16, such as through wireless communications. The data transmitted from the limb devices 62 may be sent in real-time and coordinated with the real-time calculation of the coordinate values to provide a real-time analysis of the swimmers actions, i.e., stroke rate, stroke style, speed, splits, etc.

Figure 4:
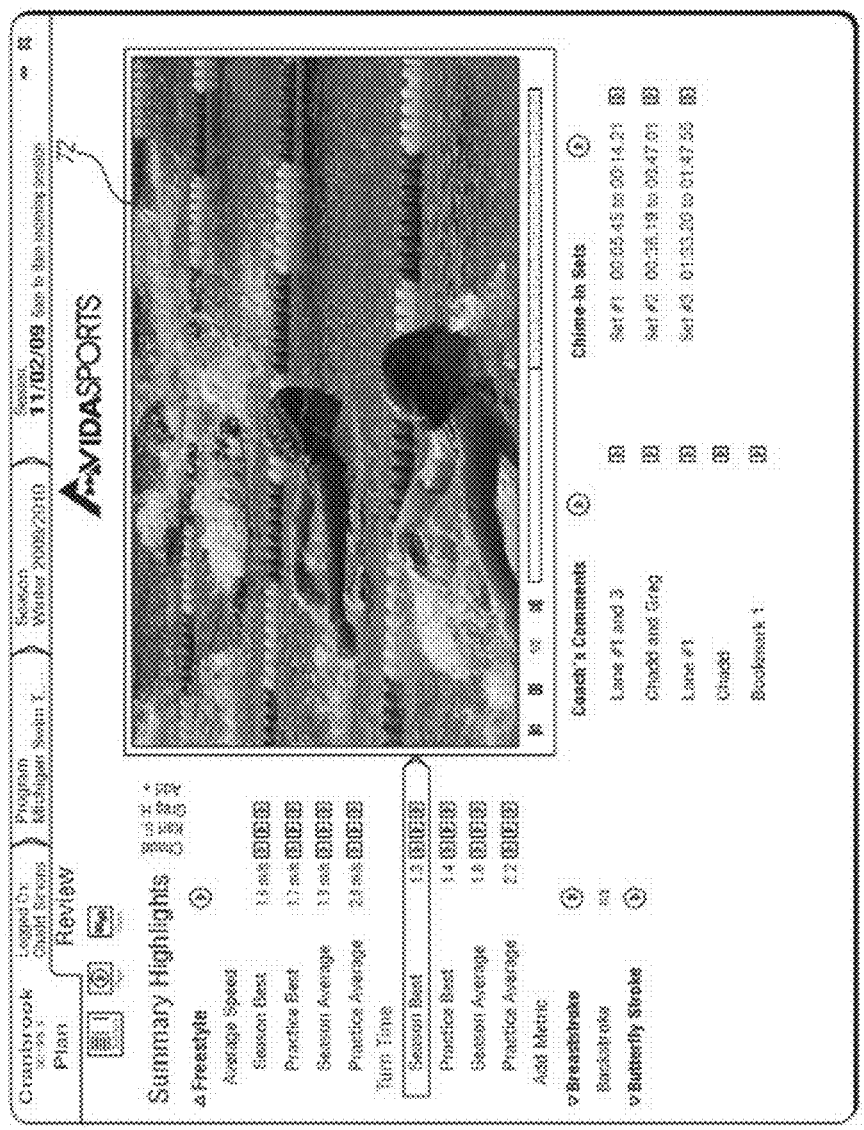
FIG. 4 illustrates a graphical user interface in accordance with one non-limiting aspect of the present invention.

The real-time telemetry may be output on a user interface of a hand-held user device 66 (see FIG. 1) connected to the master station 16 by way of a wireless node 68, such as but not limited to a tablet computer used by a coach to monitor swimmer performance. FIG. 4 illustrates one exemplary configuration of a graphical user interface 70 where the telemetry information of a particular swimmer is display with numerical values of current performance, and optionally, with color coded references to whether the swimmer is performing at, below, or above past averages/metrics. The performance telemetry may be displayed relative to a video window 72 showing a real-time video of the selected swimmer moving through the swimming pool. The video may be captured with one or more video cameras 74 (see FIG. 1) positioned around the swimming pool. The feeds from the video cameras 74 may be spliced together to provide a continuous video as the feed switches with movement of the swimmer between the cameras 74 placed at different locations along the pool and/or one or more of the cameras 74 may be configured to automatically move with the swimmer according to positional information determined from the coordinate values.

A central server 78 and one or more personal computers 80 may be included in the system 10 (see FIG. 1) to facilitate storing the performance telemetry for any number of swimmers and to allow the swimmers to retrieve the telemetry data and recorded video at later time for review. The central server 78 may include a billing application 82 and registration application 84 to facilitate managing online content and subscription based services to the performance telemetry. Online social networks may be established to facilitate remote training and competitions between swimmers swimming at different swimming pools across the country. One of the advantageous contemplated by the present invention relates to its ability to provide real-time feedback during practice and retrieval feedback at a later time, such as to support film study and review by the swimmer themselves. The system 10 supports a full spectrum of performance telemetry and is particularly suited to performance telemetry of the type that is based at least in part on obtaining a positional location of the tracked entity.

The positional tracking described above relies on a camera 12 or other sensor to positionally orientate a signal from one or more beacons 28, 30 included on a swimmer. This methodology is believed to be particular beneficial to supporting the real-time performance telemetry contemplated by the present invention since it allows the master station 16 or some other entity other than the head device 14 to perform the positional calculations. This can be helpful in reducing the size, complexity, and cost of the head device 14, although the present invention fully contemplates configuring the head device 14 to calculate their own positional coordinates through wireless communication and processing of the image frames 20, 22. The head device contemplated by one non-limiting aspect of the present invention, however, may include wireless communication capabilities and other capabilities necessary to implementing the objectives of the present invention, such as but not limited to having an transceiver (not shown) to support one-way or two-way information exchange and processing over a wireless system established with the master station.

The wireless system may be used by both of the limb and head devices 14, 62 to facilitate wireless communications with the master station 16. The limb device communications may be used to transmit accelerometer, biometric, and other types of data collected by the limb devices 62 to the master station 16. The wireless communications may be facilitated with the use of MAC address or other unique addresses assigned to each of the head and limb devices 14, 62 so that messages sent to and received from the head devices 14, 62 can be uniquely identified and controlled. The master station 16 may include a table or other representation to further correlated the MAC address with particular swimmers, such as by requiring each swimmer to log-in prior to practice or to otherwise identify themselves with a particular head device. The master station 16 may further associate the head device with a particular signature or other unique representation to be output from the associated beacon 28, 30 so that each beacon 28, 30 shown within the image frames can be identified with a particular swimmer.

One non-limiting aspect of the present invention contemplates the beacons 28, 30 emitting signals with a self-identifying pattern (such as but not limited to emitting signals at particular sequence or flash rate) and/or at a predefined interval of time. The self-identifying pattern may be a slightly more complex signature since it may require the master station 16 to assign and decipher unique patterns for a number of head devices 14, which can be difficult should there be 50 or 100 swimmers being tracked at the same time. The predefined interval assignment process may be less complex since it may only require the master station 16 to monitor an epoch assigned to each of the head devices 14 for beacon transmissions. Each beacon 28, 30, optionally, may be assigned a unique epoch where it is the only beacon transmitting a signal at a particular period of time. In this scenario, the timestamp associated with each image frame can be cross-referenced with the beacon 28, 30 assigned to transmit during that period of time to identify the one or more beacons 28, 30 within the image frame 20, 22. In this manner, the present invention is able to generate positional coordinate locations for the swimmer without requiring the head device 14 to calculate its own position.

Figure 5:
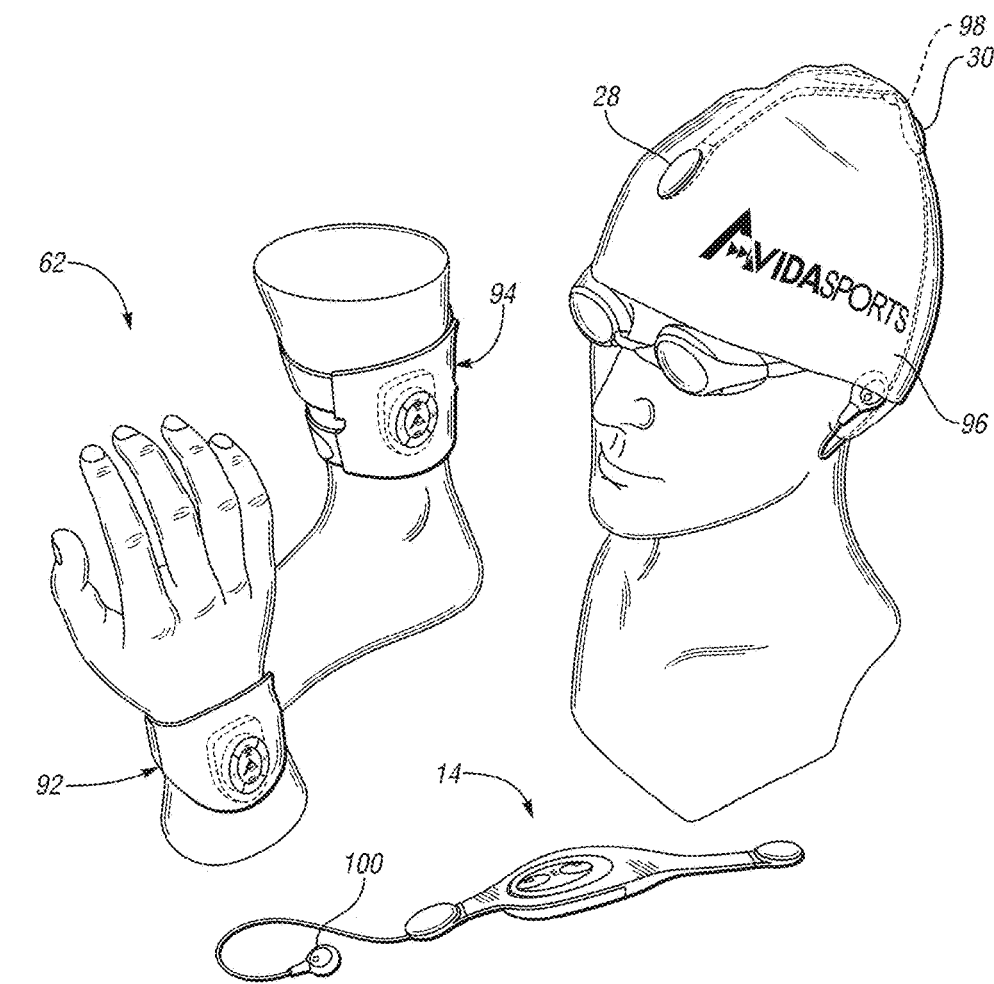
FIGS. 5-6 illustrate head and limb devices in accordance with one non-limiting aspect of the present invention.

The head and limb devices 14, 62 may be battery powered and waterproof/resistance to support wireless operation within the swimming pool and other environments. A docketing station 90 having ports for each set of the limb and head devices 14, 62 may be included in the system to facilitate battery charging, and optionally, software loading and updating. FIG. 5 illustrates the head and limb devices 14, 62 being particularly configured to support operation with a swimmer in accordance with on non-limiting aspect of the present invention. The limb device 62 may be configured for receipt within a wrist wrap 92 and an ankle wrap 94. The head device 14 may be configured with the first beacon 28 and the second beacon 30 that protrude through corresponding openings within a swim cap 96.

Figure 6:
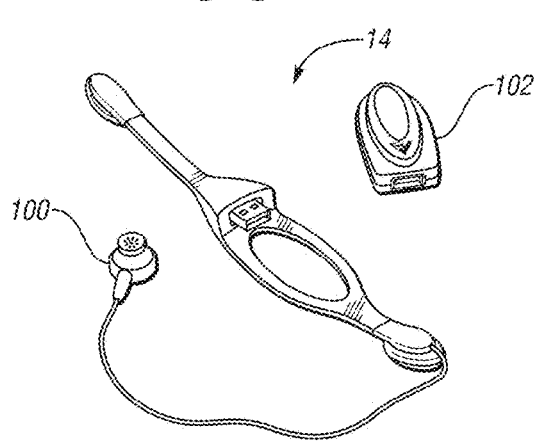

The head device 14 is further shown to include an ear bud 100. The ear bud 100 may be used to facilitate audio communications with the simmer One form of audio communication may include the master station 16 or other device wireless transmitting verbal instructions from the coach to the swimmer, such as through a microphone (not shown) included on the tablet device. Another form of audio communication may include the head device 14 being programmed, either wireless while the swimmer is swimming or before, to issue chimes and other audio references to swimmer to indicate distance traveled, stroke rhythm, etc. and/or to simply play music. As shown in FIG. 6, the head device 14 may include a detachable pod 102 that can be connected through a USB port to the charging station 90. The swim cap 96 may include an envelope 98 or other structure to position the first and second beacons 28, 30 relative to the openings.

While the use of both of the first and second beacons 28, 30 is not required, it may be helpful to have one or more of the beacons 28, 30 emitting the signal. Optionally, the master station 16 may assign each of the first and second beacon 28, 30 their own transmission interval so that only one beacon is transmitting within each image frame 20, 22. The first beacon 28, for example, can be used when the swimmer is performing a breaststroke or other action where the rearward portion of the head may be pointing away from the camera, such as towards a bottom of the pool or other direction where refraction/reflection may prevent a proper reading of the signal from the rearward beacon 30. Similarly, the second, rearward beacon 30 may be used when the swimmer is performing a freestyle stroke or other action where the forward portion of the head may be pointing away from the camera, such as towards a bottom of the pool or other direction where refraction/reflection may prevent a proper reading of the signal from the forward beacon 28. The emitting beacon 28, 30 may be selected based on accelerometer data collected from the limb device 62, such as through direct wireless communications between the limb and head devices 62, 14 or by way of master station 16 wireless communications, and/or the head device 14 may include an accelerometer to make its own determination.

FIG. 7 illustrates an exemplary set of accelerometer data 200 collected by an accelerometer included within the head device 14 while a swimmer performs each of a butterfly, back, breast and crawl stroke. Similar accelerometer data may be captured by the limb devices 62 (referred interchangeably as a leg sensor 94 when attached to a leg and arm sensors 92 when attached to an arm) to reflect movement of the related body part while swimming and/or while performing other types of movements. The present invention is particularly described with respect to generating performance metrics while swimming but the present invention fully contemplates its application in generating performance metric for other types of movements and athletic events/competitions. FIG. 8 illustrates a coordinate system 202 used to relate the x, y, and z values to movements within to x, y, and z directions detected with an accelerometer.

One type of accelerometer contemplated by the present invention to generate the illustrated data may be configured to sense a rate of change in velocity of all three axes/directions (i.e., x, y, and z). Other types of device capable of generating similar data may include a gyroscope (absolute positional generation defined as pitch, yaw, and roll), a magnetometer (dead reckoning), compass, etc. The accelerometer may include a weight attached to a lever arm to record the x, y, and z movement according to measureable responses of the lever arm to movement. This type of accelerometer may be configured to generate the x, y, and z values while experiencing any type of non-constant movement. The accelerometers or other device used in place thereof may also be configured to generate similar values when experiencing constant motion, however, since the performance metrics generated according to the processes described below are predicated upon the accelerometer relying on recording velocity change, the present invention is described predominately without regard to the use of a constant motion detecting accelerometer.

The data shown in FIG. 7 and the performance metrics generated by the present invention are described with respect to generic x, y, and z values in that the corresponding values may vary depending on the characteristics of the particular accelerometer being used. The noted values are therefore not intended to limit the scope and contemplation of the present invention as the present invention fully contemplates the values, and in some cases thresholds, being varied according to the characteristics of the accelerometer, processing capabilities of the processor performing the calculations, and/or other design considerations.

FIG. 9 illustrates a flowchart 206 of a method for generating performance metrics in accordance with one non-limiting aspect of the present invention. Block 208 relates to identifying a swimming stroke being performed by a swimmer, or other movement in the event the present invention is used to generate performance metrics for non-swimming based movement. FIG. 10 illustrates a flowchart 210 for stroke identification where a method is described for determining whether a swimmer swimming within a swimming pool is performing a crawl stroke, back stroke, butterfly stroke, or breast stroke based on the accelerometer data captured by the arm sensors 92 and head sensor 14. The flowchart is described without analyzing data collected by the leg sensors 94 as part of the stroke identification process since one non-limiting aspect of the present invention contemplates identify the swim stroke without reliance of on leg sensor data. The present invention, however, fully contemplates relying on leg sensor data to perform the noted identification or to confirm or refine the data collected form the arm and head sensors 92, 14.

The flowchart 210 begins in Block 214 with analyzing the x, y, and z values to assess whether the swimmer is performing a swimming stroke having an alternating arm pattern whereby the swimmer's arms move out of sequence to each other when propelling the swimmer through the swimming pool (i.e., crawl stroke and back stroke). Block relates to identifying the alternating arm pattern based on comparing the accelerometer data for the left arm with the same data collected from the right arm. FIGS. 11a-11b illustrate one such comparison process as contemplated by one non-limiting aspect of the present invention. This comparison process, and other calculations/processes noted herein, may be performed by processors included on the swimmer devices 14, 62 (leg, arm, and head devices) and/or with the master station 16 operating in parallel therewith or independently thereof.

The alternating type stroke may be identified as a function how closely aligned the left arm accelerometer data matches with the right arm accelerometer data for a certain period of time. FIG. 11a illustrates a square wave 218 generated from a graph 220 of the accelerometer data from one of the arm sensors 92. The square wave 220 marks the rising and falling edges of the accelerometer data where the data experiences a zero axis crossing. Returning to FIG. 8, the swimmer's movement through the pool, as reflected by the acceleration changes, indicates a relatively cyclical process, tending towards a sine wave type appearance and in strokes having repeated zero axis crossings. These zero axis crossing may be used to create the illustrated square wave 218. The amplitude of each square is shown to be normalized to 1 or −1 depending on the corresponding signal from which it is derived. While the actual amplitude may be greater than 1 or −1, these values are selected to simplify further processing.

The alternating stroke identification process may include:
1. Each arm device bandpass filtering each axis of the accelerometer data to remove the DC offset and high frequency noise;
2. Generating a square wave for each axis;
3. Multiplying the corresponding square waves axes from each arm together (FIG. 11b exemplarily illustrates square waves 224, 226 generated for one axis of each arm and a wave 228 resulting from the multiplication thereof);
4. Averaging the multiplied values from each axis over a lap length;
5. Squaring the averages from each axis to accentuate axes with more phase discrimination; and
6. Summing the results from each axis, keeping the sign (+ or −) for each. The summed result may then be compared to zero to identify whether an alternating stroke was performed, e.g., a value >=0 indicates the limbs are not alternating and a value <0 indicates the limbs are alternating.

The A value used to identify an alternating stroke in the described manner may be generated from the following formula:

$$A = \S\left(\sum_{i=1}^{N} X_{Ri}X_{Li}\right)^2 + \S\left(\sum_{i=1}^{N} Y_{Ri}Y_{Li}\right)^2 + \S\left(\sum_{i=1}^{N} Z_{Ri}Z_{Li}\right)^2$$

wherein $x_L$, $y_L$, and $z_L$ are values used by the left arm sensor to quantify movement in the corresponding x, y, and z directions; wherein $x_R$, $y_R$, and $z_R$ are values used by the right arm sensor to quantify movement in the corresponding x, y, and z directions; and wherein § is a positive value of 1 when the corresponding x, y, and z value represents movement the positive direction and a negative value of 1 when the corresponding x, y, and z value represents movement in the negative direction.

An analysis of the swimmer's head orientation may be made in Block 232 in the event an alternating swimming stroke is determined. The head orientation may be considered to be head-up when the forehead/face of the swimmer is pointing generally towards the bottom of the pool or forwardly towards the end of the pool as it would be positioned when executing a crawl, breast, or butterfly stroke. The head orientation may be considered to be head-down when the forehead/face of the swimmer is pointing generally upwards out of the pool as it would be positioned when executing a back stroke. The head orientation may be measured by low-pass filtering the sum of the X and Z axes, accelerometer data such as over a sampled period of time (e.g., every two seconds). The resulting signal may then be averaged to generate a value H for comparison to a threshold. Based on empirical testing, a threshold of six, which is a relative thresholds tied to the particular data generated by the accelerometers that was determined to be a sufficient indicator of the head orientation, i.e., being orientated to the head-down position if less than six and in the head-up position if greater than six.

The H value used to arbitrate between the head-up and head-down orientation may be determined according to the following formula:

$$H = x_H + z_H;$$

wherein $x_H$ and $z_H$ are values used by the head sensor to quantify movement in the corresponding x and z directions. The y-axis is shown as not being considered as part of the head orientation determination because it tends not to experience as much movement as the x and z axes, making it potentially more difficult to filter, and because the x an z axes were determined to be sufficient, allowing extra filtering of the y-axis to be omitted.

A back stroke is determined in Block 234 in the event the arms are determined to be alternating and the head is determined to be orientated head-down. A crawl stroke is determined in Block 236 in the event the arms are determined to be alternating and the head is determined to be orientated head-up. These identifications allow the present invention to identify the crawl and back stroke swimming strokes from accelerometer data sensed by the arm sensors 92 and head sensors 14. Alternatively, a similar determination can be made either using the arms sensors 92 and/or head sensors 14 exclusively by quantifying the subtle nuances of each stroke. The illustrated method was described in more detail as this method is believed to provide a more easily detectable and/or repeatable process for crawl and back stroke identification.

An analysis of the swimmer's arm angle may be made in Block 240 to identify performance of one of the butterfly and breast strokes in Blocks 242, 244 in the event the arms are determined to be moving in unison, making it impossible for the swimmer to be performing a proper crawl or back stroke (the present invention assumes legal or proper strokes are being performed in most cases at least in so far as identifying the stroke with one of the known crawl, back, butterfly, and breast strokes). The hands tend to move to a vertical position during a breast stroke's sculling motion and to remain in a flat position during a butterfly stroke. This results in a different average angle of the arm that can be registered with the accelerometers measuring gravity (gravity appears as the DC average from the accelerometer).

The arm angle may be found by measuring the DC offset in the X- and Y-axis over the entire lap length, i.e., from end to end of the pool. The DC offset is considered to be the zero frequency point of the frequency varying accelerometer data, which may be determined by averaging each of the x and y values for a given lap to determining a resulting x and y DC offset value. An arm angle value $B_a$ may be identified therefrom to represent the X DC offset value minus the Y DC offset value. If the arm angle value $B_a$ is above a threshold, the stroke type is butterfly; otherwise the stroke type is breaststroke. The threshold generally corresponds with the butterfly stroke being identified when the value $B_a$ is small and the breast stroke being identified when the value $B_a$ is large, mainly due to the y value typically being smaller during the breast stroke.

The $B_a$ value used to arbitrate between the butterfly and breast stroke may be determined according to the following formula:

$$B_a = \text{avg}(x_R) - \text{avg}(y_R)$$

wherein $x_R$ and $y_R$ are values used by the right arm sensor to quantify movement in the corresponding x and y directions. The $X_L$ and $Y_L$ values are omitted to simply process, however, those values may be considered to confirm the results of the right arm sensor. The z values are shown to be omitted because the z values tend not to reliable represent and/or add value to the desired determination. The head sensor data may also be used to identify breast and butterfly swimming strokes, as described below in more detail.

FIG. 12 illustrates a flowchart 250 for stroke identification where a method is described for determining whether a swimmer is performing a crawl stroke, back stroke, butterfly stroke, or breast stroke based on the accelerometer data captured solely from the head sensor 14. The method of FIG. 12 may be beneficial, for example, when the limb devices 62 are unable to reliably communication with the master station 16 due to being underwater, such as when performing the breast and butterfly strokes. The ability to rely on the head sensor 14 to identify stroke type also allows for information to be output to the coach's tablet or for other uses in real-time while the swimmer is training and information is unavailable form the arm and/or leg sensors 62. The master station 16 can then rely on the identified stroke to facilitate metric feedback in the absence of information being received from the limb devices.

Once the limb devices 62 are able to communicate with the master station 16 again, such as when the limb devices 62 are out of the water for a sufficient period of time, the collected data may then be transmitted to the master station 16 to confirm the stroke identification or to perform other refinements to the data known to the master station 16. The method of FIG. 12 is described with respect to the processor of the head device 14 performing the noted stroke discriminations, optionally in addition to the master station 16. The head sensor 14 may then rely on the stroke identification in subsequent performance metric calculations, as described below in more detail where filters and other processing parameters can be set at least based in part on the identified swimming stroke. The ability of the swim devices 14, 62 to identify the swim stroke independently of the master station 16 can be beneficial in facilitating the stroke identification dependent processes and calculations without having to be notified by the master station of the stroke being performed, which may otherwise be problematic if the swim device 14, 62 is periodically underwater or otherwise unable to sufficiently communicate with the master station 16 (leg and arm sensors 62 may be able to perform related processing).

The stroke identification begins in Block 252 where an assessment is made regarding the head being orientated head-up or head-down, such as by using the processing described above. The back stroke is identified in Block 254 if the orientation is head-down and further assessments are begun in Block 256 in the event the head orientation is head-up. Block 258 relates to an initial assessment where y versus z activity of the head device is analyzed. The y versus z activity can be used to identify the crawl stroke in Block 260 or the need for still further processing in Block 262. The y versus z activity reflects a swimmer's head tending to roll more noticeably from side to side when breathing while performing a crawl stroke than when performing one of the breast and butterfly strokes.

The side to side movement indicative of the crawl stroke may be determined in the event a value C representative of the amount of y movement relative to x and z movement is sufficiently high. The H value may be determined by 1. Removing the DC offset from X-, Y-, and Z-axes with a highpass filter; finding a sum of squares point-by-point in each axis;
2. Measuring Y-axis RMS amplitude;
3. Adding X- and Z-axes (squared) to find combined RMS amplitude; and
4. Dividing Y-axis RMS by X- and Z-axis combination RMS amplitude such that an C greater than a threshold can indicate crawl stroke detected and an C value less than threshold can indicate breaststroke or butterfly detection. The threshold may be determined empirically based on a swimmer database used to reference various swimming patterns.

The C value used to arbitrate the crawl stroke may be determined according to the following formula:

$$C = y_H / (x_H + z_H);$$

wherein $x_H$, $y_H$, and $z_H$ are values used by the head sensor to quantify movement in the corresponding x, y and z directions. (Note this formula, and other formulas included herein, omit the RMS, squaring, and/or filtering for simplicity as those operations may be optionally used to reduce signal-to-noise issues. The contemplated processes may be formed from the raw data.)

An assessment of the pattern of the swimming stroke is made in Block 262 in the event the head roll is insufficient to verify occurrence of the breast stroke or butterfly stroke in Blocks 264, 266. Block 262 relates to performing a best-fit correlation where the accelerometer data collected by the head device 14 is patterned for comparison to known stroke patterns. Since butterfly and breast strokes exhibit similar head motion to discriminate between the two, a representative set of correlation filters, some butterfly and some breaststroke, may be created for comparison purposes. The known stroke patterns may be retrieved from a memory of the swim device 14 and/or master station 16 based on accumulated historical performances of the current user, from surveys conducted for a plurality of swimmers, i.e., a template can be formed based on patterns established by multiple swimmers, or through some other suitable process. The process may be performed as part of a correlation where each of the known patterns is used to filter the accelerometer collected data. The stroke associated with the filter generating the greatest amplitude peaks may be determined to be the stroke being performed by the swimmer, i.e., the best-fitting filter will provide the greatest amplitude peaks.

The best-fit filtering process may include:
1. Identifying each stroke period (zero-crossings in X-axis filtered data averaged over the lap length) to identify the dominate stroke period for the accelerometer data of one of the arm sensors (the process may include both arm sensors if desired);
2. Creating a test filter from the two stroke periods (could use more or less than two) centered about the lap's center most stroke (the test filter being the sampled accelerometer data. (FIG. 13 illustrates an exemplary test filter selected from a graph of accelerometer data.)
3. Filtering the accelerometer data with the test filter to find signal peaks. (FIG. 13 illustrates a correlated signal graph where the resulting peaks are evident.)
4. Identifying an average stroke period based on each stroke period shown within the correlated signal graph generated in step 3.
5. Selecting a filter family from a plurality of filter families having stroke periods most closely aligned with the average stroke period found in step 4. The filter families include know patterns for breast and butterfly strokes organized according to stroke period (stroke period may vary depending on swimmer competence, size, etc.)
6. Filtering the accelerometer data with each a plurality of filters include within the selected filter family to identify filter producing the highest amplitude output;
7. Identifying the strokes to be butterfly strokes if the highest output was from a butterfly stroke filter and to be breast strokes if the highest output was from a breast stroke filter.

Returning to FIG. 9, a stroke counting operation may be performed in Block 270 according to the stroke identified in Block 208. Block 270 is shown to occur after Block 208 for exemplary purposes and without intending to limit the present invention to any particular sequence of operations. Some or all of the processing contemplated by the present invention each Block 270 may be performed in parallel such that the swim device processors and/or the master station processor(s) may be operable to execute the contemplated process in parallel or any other desired sequence. One stroke counting process contemplated by the present invention relates to an autocorrelation or cross-correlation filtering process where a reference stroke is taken from the accelerometer data and compared to rest of the accelerometer data to count the number of strokes. This reference stroke may be determined on a lap-by-lap basis, at periodic/random intervals while the swimmer continues the same stroke, and/or once for the identified stroke.

FIG. 13 illustrates a graph 272 of accelerometer data collected from one of the swim devices over a particular period of time. Correlation filtering is a mathematical process of comparing a length of data 272 to a reference waveform 274, which may be selected from the data 272 or known in advance, (i.e. passing it across a length of data) in search of a match(s). Where the data waveform 272 closely matches the reference waveform 274, the mathematical equation of the correlation filtering produces a filtered signal 276 high output signal amplitude (signal peak), i.e., significant rate changes with improved signal-to-noise ratio, at the point in time where the match occurs. These peaks can be reliably identified by a peak detection- and threshold-based algorithm.

Autocorrelation is a special correlation case where a reference waveform is extracted from the actual signal. This process for counting strokes over a single swimming lap may include:
1. Deciding when the swimmer is producing strokes (bracketing a length of data to be processed).
2. Establishing a dominant period, or rate, of the stroke within the length (repeating cycle of activity likely to represent a stroke). The average stroke period (or dominant stroke period) may be found by low pass filtering the axis with the highest RMS amplitude and computing the average period using zero-crossings.

3. Identifying and recording a preliminary reference stroke (e.g., the stroke used for the autocorrelation, such as a fixed stroke, i.e. a second stroke (first and last strokes are typically uncharacteristic) or middle stroke occurring at the middle of the lap, or the stroke pattern most commonly occurring throughout the lap). A preliminary reference stroke signal may be selected to be twice the average period near a middle of the swum length centered on the peak of a signal computed as $(X^2+Y^2+Z^2)$. Unlike the dominate period that represents time, the preliminary reference stroked is a sample of the actual signaling and includes values to reflect movement in each of the x, y, and z axes.

4. Positioning the start of the preliminary reference stroke to coincide with the initiation of the first stroke. The positioning is a centering of the reference stroke by isolating the region where the first stroke begins and then applying an activity-detection filter over this region to identify the transition point from no activity to activity. The positioning of the reference stroke aligns the reference stroke phase with the data length (accelerometer data for one or more laps) phase. This alignment influences the filtering in step 5 since the peaks of the strokes detected thereafter in the data length will be aligned relative to the aligning of the reference stroke to the first stroke. Misalignment can result in extra strokes being counted or stokes being omitted.

5. Filtering the data length with the reference stroke to identify peaks, and therefrom, the corresponding stroke.

6. Identifying and averaging three strokes identified in step 5 to create a final reference stroke (i.e., after all the strokes are identified with the preliminary reference stroke one of more of those strokes—noted as three—may be used to generate another, final reference stroke). Averaging three strokes over the length makes the correlation process more forgiving of variations in the swimmers stroke. The second, second to last, and centermost strokes may be selected, optionally using only strokes greater than 30% of the peak correlation.

7. Correlating the data length against the final reference stroke to find all strokes. The correlation output signal may be scaled relative to the highest peak across the length from 0 to 100%.

8. Counting strokes as those having outputs above a numerical threshold, e.g., 30%.

FIG. 13 illustrates the final reference stroke 274 as selected from the graph of accelerometer data. This final reference stroke 274 is shown to include data for each of the x, y, and z axes, however, the present invention fully contemplates relying on less than all of the axes data when counting strokes. The correlated output of the final reference stroke 274 as filtered through the graphed data is shown with a correlated output 276. The correlated output 276 includes a number of more clearly defined peaks. The amplitude of each peak quantifies how closely the corresponding segment of the accelerometer data matched with the final reference stroke. The present invention counts a stroke for each one of the amplitudes having a value greater than a stroke counting threshold. The stroke counting threshold may vary from swimmer to swimmer, particularly with respect to swimmers having less skill or more variability in their stroke patterns. Based on empirical analysis, the threshold is set to 35% of the maximum peak amplitude for the data set.

Figure 14:
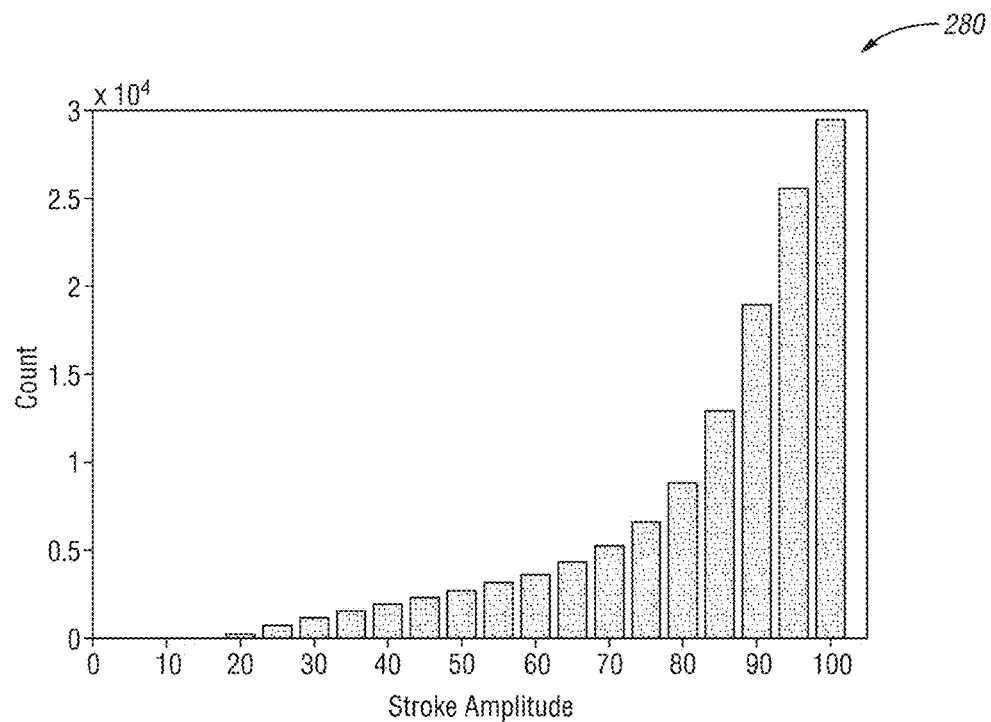
FIG. 14 illustrates a histogram plot in accordance with one non-limiting aspect of the present invention.

FIG. 14 illustrates a histogram plot 280 of the number of amplitudes detected after completion of an autocorrelation process. The y-axis is plotted according to counts representative of sampling intervals or periods during which an amplitude was identified for a certain stroke. The number of counts is rather large to represent a certain sampling size. A similar approach may be used with a smaller sampling size, such as on per swimmer basis, lap or multiple-lap basis, etc. The x-axis is plotted according to the output value of the corresponding amplitudes measured as a percentage from 100%, i.e., closer matches having a greater percentage than lower matches. The graph 280 illustrates a partially exponential trend where the number of counts having amplitudes greater than 80% start to rapidly increase. This point of inflection, commonly referred to as a knee, may be used to signify 'quality' or 'matched' strokes. The matched strokes may be considered to be the strokes most closely matching the dominate stroke (reference stroke0 of the swimmer, at least for the measured lap(s).

Figure 15:
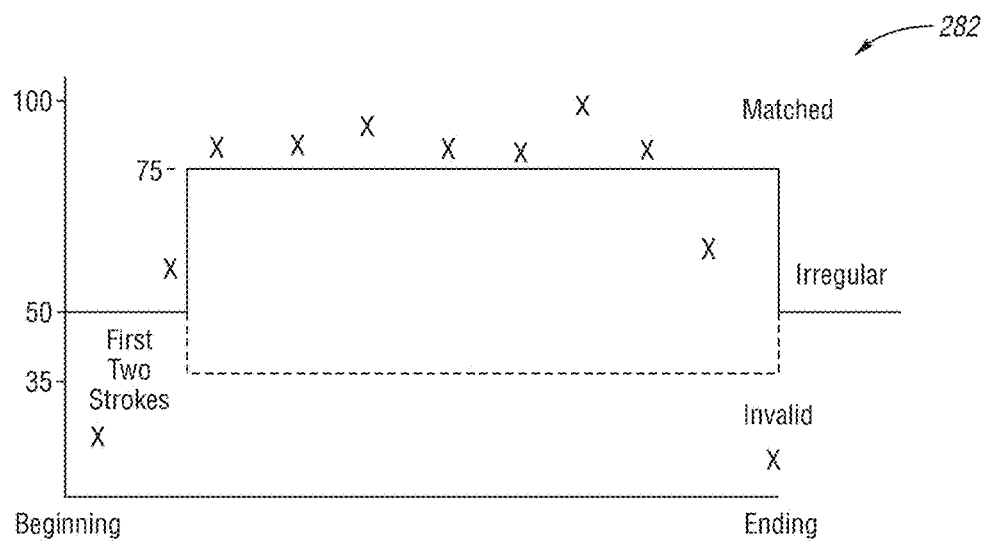
FIG. 15 illustrates a matching plot in accordance with one non-limiting aspect of the present invention.

The ability to contrast matched strokes with other counted strokes allows the present invention to further refine the performance metrics to include an assessment of how well the swimmer was able to repeat the same stroke throughout the lap. The consistency and ability of swimmers to repeat the same stroke throughout a given lap can be beneficial in allowing the swimmer to accurately assess their performance. FIG. 15 illustrates a matching plot 282 that may be generated to pictorially reflect how well the swimmer was able to repeat the same stroke throughout one or more laps. The plot includes a first, second, and third threshold (represented respectively at 75%, 50%, and 35% lines) where the first threshold is selected to correspond with the match percentage occurring at the histogram knee of FIG. 14 (e.g., where the top ⅔ of the amplitude strokes occur, which is selected as 75% in the illustrated example), the second threshold is selected to correspond with a minimum match percentage, and the third threshold is selected to correspond with acceptable match percentages for the first and last stroke, which typically and acceptable differ from the other strokes (e.g., 50%).

The matching plot includes an x to mark each of the stroke amplitudes registered while swimming a lap (only one lap is shown however any number of laps may be included end-to-end and/or one lap may be illustrated with the data from multiple laps being superimposed). Matched or the highest quality strokes may be those occurring above the first strokes, irregular or lower quality strokes may be those occurring between the first and second threshold, and invalid strokes may be disregarded as being too low quality since strokes below 25% correlation output may be incomplete or more representative of another non-stroke action. The matching plot allows the swimmer and/or coach to review the swimmers stroke matching throughout the lap and to easily identify periods during which the swimmer may have deviated from the reference stroke. This can be beneficially in identifying trends and habits for the swimmer, such as whether the swimmer tends to perform an irregular stroke at a particular portion of the lap, for example, if the swimmer develops a habit of shorting a middle stroke.

Another stroke counting process of the present invention contemplates counting strokes using accelerometer data from only the x and z axes. This stroke counting process may be beneficial for use with the head device and counting strokes during a breast stroke when the transmission of accelerometer data from the arm and leg sensors can be more difficult. The stroke counting may be generally similar to that described above in at least so far as correlating the captured data with itself to identify peaks. The counting may be further refined by limiting the correlation to the x and y values, and optionally without averaging multiple strokes to identify the final reference stroke, i.e., one reference stroke can be selected and used throughout. In the case of a breast stroke the stroke counting process may vary slightly in that the reference stroke may be aligned relative to a beginning of the breast stroke, such as at a rising edge of the x-axis data, which typically occurs during breast stroke when the swimmer's head rises up out of the water.

Figure 16:
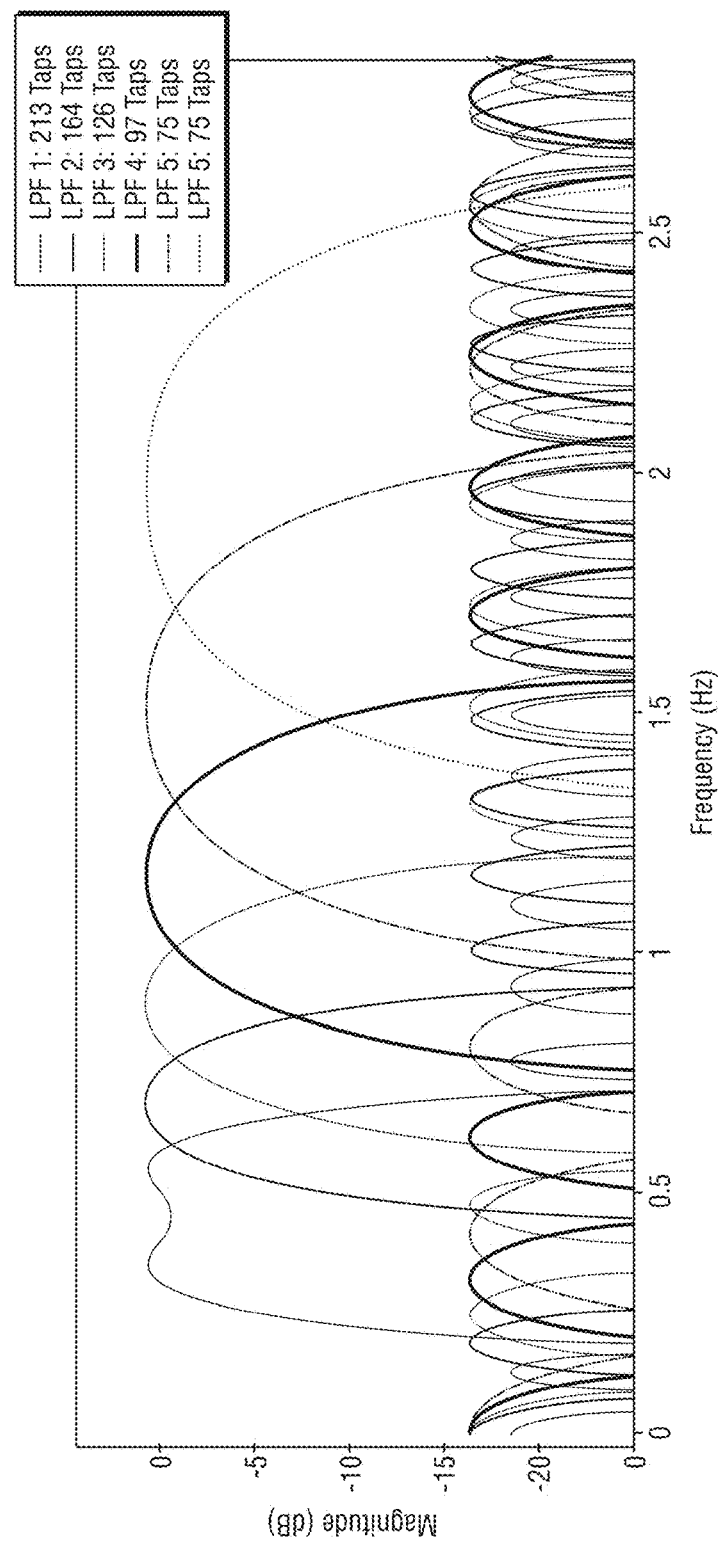
FIG. 16 illustrate a graph of leg accelerometer data filtered according to a kick counting filtering process contemplated by the present invention.
Figure 17:
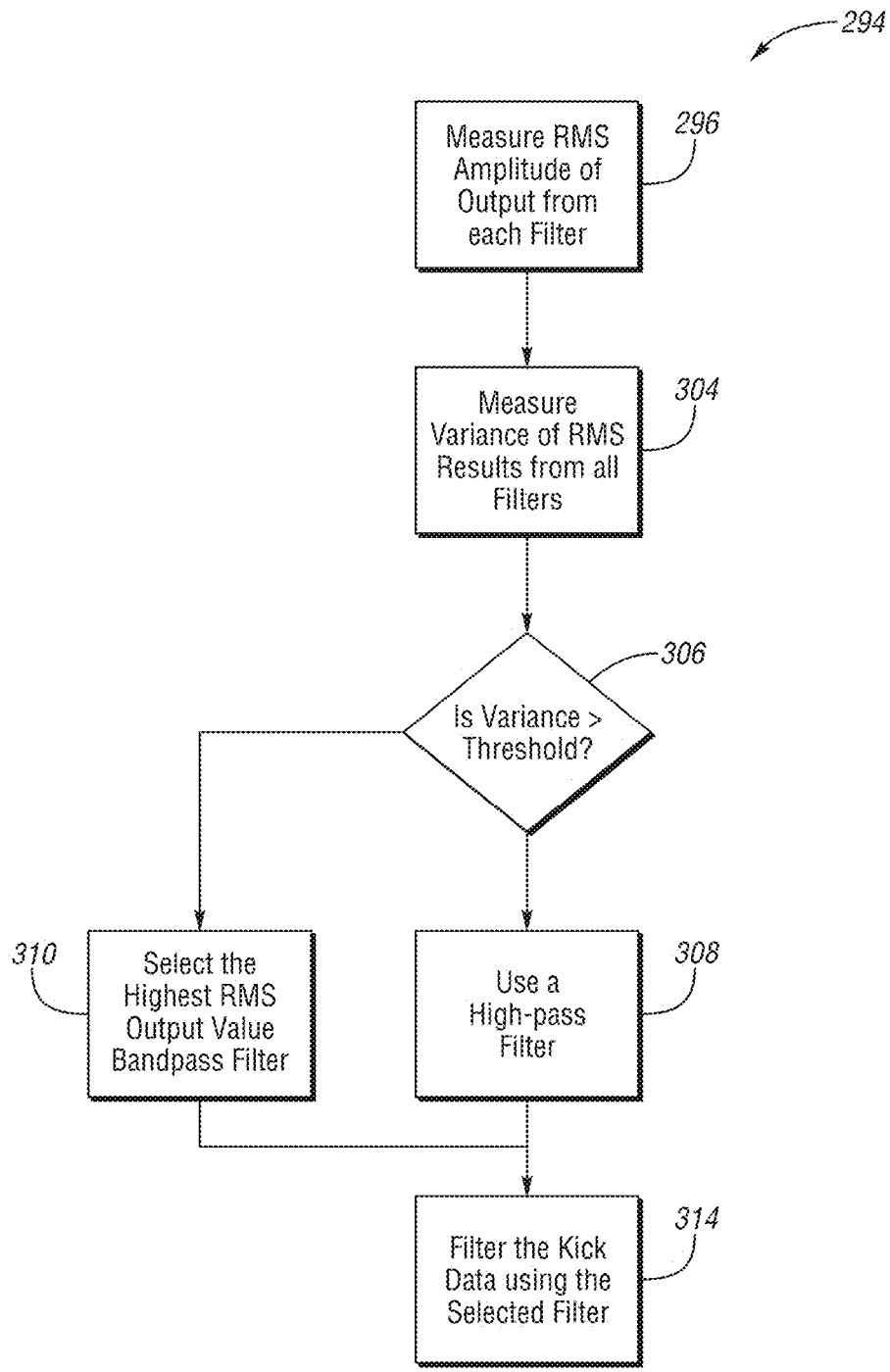
FIG. 17 illustrates a flowchart of a kick counting process in accordance with one non-limiting aspect of the present invention.

Returning to FIG. 9, an additional performance metric may be determined in Block 290 to reflect the number of kicks performed while swimming one or more laps. The number of kicks may be counted from accelerometer data of the leg devices 94, and in some cases, simply from the accelerometer data of the arm/head device(s) 92, 14, e.g., when performing the breast stroke the number of kicks can be counted based on the number of strokes since the swimmer makes one kick for each properly performed breast stroke. FIG. 16 illustrate a graph 292 of leg accelerometer data filtered according to a kick counting filtering process contemplated by the present invention. FIG. 17 illustrates a flowchart 294 of the kick counting process used to generate the graph and assess the number of executed kicks.

Block 296 relates to assessing RMS amplitude of peaks detected by each of a plurality of filters applied to the leg data. As shown in FIG. 16, a number of lowpass filters (LPF 1-7) are used to filter the leg accelerometer data in the frequency domain. Each filter reflects the frequency characteristics of the accelerometer data relative to the frequency characteristics of each of the applied filters. The filters selected for Block 296 may vary depending on personal characteristics of the swimmer, i.e., filters may be selected passed on past history or skill level, the filters may be the same for each swimmer with each of the filters being aimed to identify a unique pattern (the patterns may be generated empirically), or through other means.

Figure 18:
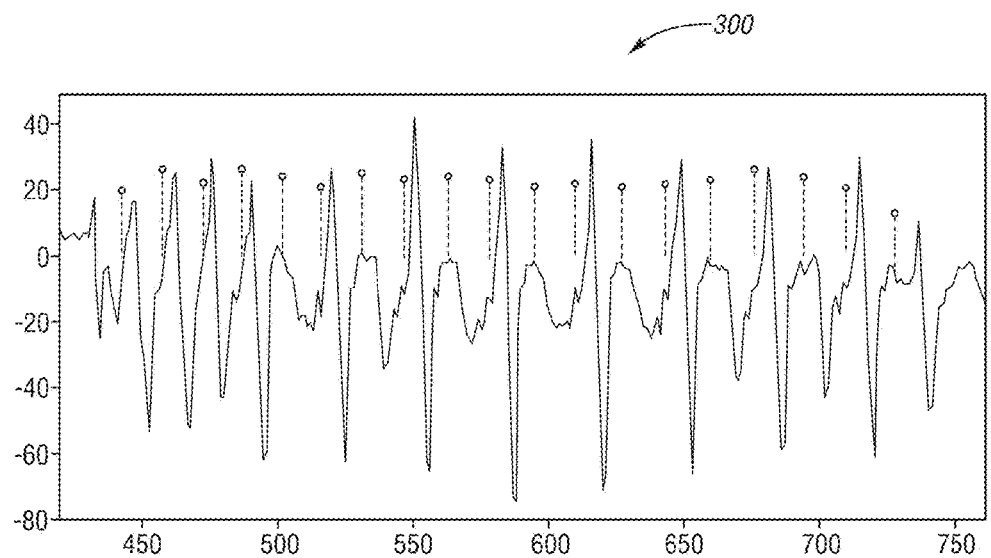
FIG. 18 illustrates a sinusoidal kicking pattern in accordance with one non-limiting aspect of the present invention.
Figure 19:
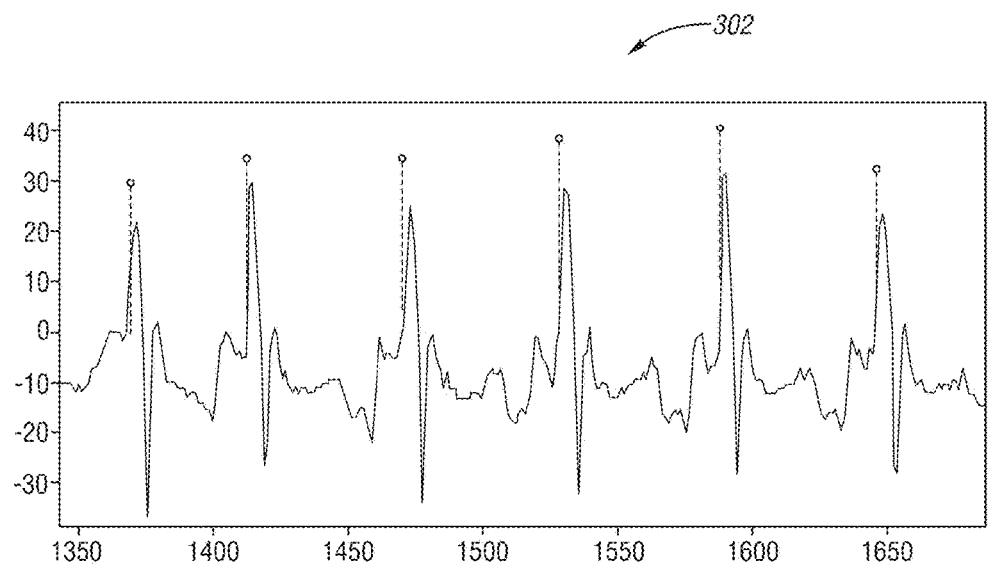
FIG. 19 illustrates an impulse kicking pattern in accordance with one non-limiting aspect of the present invention.

FIG. 18 illustrates a graph 300 raw, y axis data for a sinusoidal kicking pattern. FIG. 19 illustrates a graph 302 raw, y axis data for an impulse kicking pattern. The sinusoidal kicking pattern tends to have a less degree of amplitude variation relative to the amplitude variation of the impulse kicks, typically due to the impulse kicks being more a more of a 'snapping kick as opposed to the sinusoid shape associated with a 'rolling' kick. Block 304 relates to measuring the variance of the RMS results for all the applied filters, i.e. LPF 1-7. If the variance is determined in Block 306 to be too low, (i.e. all filters give similar RMS output) and no single filter result stands out, impulse-type kicks ("snappy" kicks) are assumed. A high-pass filter is selected in Block 308 to filter the accelerometer data for peaks in the event the variance is sufficiently great. The filter of the previously applied filters producing the highest RMS output (measured as an average for each peak and/or as the one generating the single greatest peak) is selected in Block 310 in the event the variance is less than the threshold.

Figure 20:
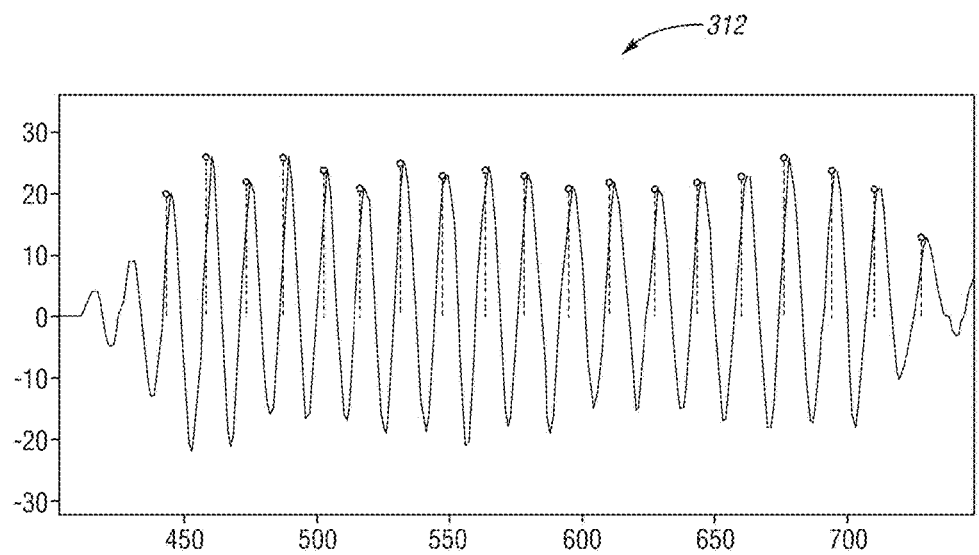
FIG. 20 illustrates a graph of peak identification in accordance with one non-limiting aspect of the present invention.

FIG. 20 illustrates a graph 312 the values of FIG. 18 being filtered where each peak is identified as a single kick. Block 314 counts kicks to occur are each peak. The counted kicks may further be defined within the generated performance metrics such that kicks are defined as peaks greater than 10 (empirically derived to represent kicks) in the leg Y-axis acceleration data while the arms are considered to be stroking (between the first and last stroke). The total kick count for breast stroke and butterfly stroke is the kick count of the limb with the greatest number of kicks. The total kick count for back stroke and crawl stroke is the sum of the kick count of each limb. Kick tempo is the average time taken per kick over a length swam. Kick tempo is computed by dividing the kick duration by the kick count. The kick duration is defined as the as the time difference between the last kick and the first kick within the counting region.

The foregoing description, and in particular the assessments made regarding stroke identification, stroke counting, and kick counting, presume the data used in those assessment corresponded with a period of time suitable to undertaking the related processing, i.e., that the swimmer was actually swimming and not walking around or within the pool or performing some other non-swimming activity. The time markers used to assess a swum lap and when to begin/stop counting strokes were also presumed to be known. The processes of actually detecting whether the user is actually swimming and whether has started/completed a swum lap can be determined from the accelerometer data in accordance with the present invention and as further described below.

The initial determination of whether the swimmer is actually swimming may be based on an end of length (EOL) determination. The EOL may be a broad time bracket intended to identify conditions typically associated with a swimming based event, i.e., events representative of a swimmer actually performing legal/proper swimming strokes. A starting EOL and an ending EOL may be determined to identify when a user starts and stops swimming. The EOLs can be helpful in limiting processing demands on the swim devices 14, 62 and/or master station 16 to data collected around the time of the EOLs, i.e., some processing may be saved by limiting the processed data occurring within some period of time prior to the staring EOL, data occurring within the period of time between the starting and ending EOLs, and data occurring within some period of time after the ending EOL. This process of selecting or segmented the collected accelerometer data in one or more portions as a function of the EOLs may be characterized as bracketing. The bracketing may define brackets in time during which particular portions of the data are analyzed to generate one or more corresponding performance metrics.

Bracketing a length of swimming activity enables the present invention to process metrics on a length by length basis or at virtually any desirable interval. Length bracketing (EOL selection) may be accomplished by band-pass filtering the arm accelerometer output for a specific range of acceleration as typically observed at the beginning and end of each length. The corresponding x, y, and z values may be squared to accentuate gross changes in speed of the swimmer and summed to identify amplitude peaks. The order and sequence of peaks may be then be used to identify patterns/sequences indicative of EOL events. While this broad approached to identify periods during which the swimmer is actually swimming can be helpful in limiting processing demands, the present invention contemplates a more granular and precise process for identifying markers indicative of when the swimmer starts and completes each lap, e.g., markers used to quantify time and other metric outputs requiring more precision.

The point at which the swimmer starts and completes each lap can be difficult to ascertain from the accelerometer data since some motions and movement performed while swimming can appear from the accelerometer data to be almost identical to events occurring at the beginning and ending of a lap, i.e., events associated with the swimmer turning and pushing off the wall to start another lap (referred to as a middle lap), touching the wall when completing a last lap, and diving into a pool to start a first lap (diving may be considered to be equivalent to a push-off event). Bracketing can be used to limit the portions of the accelerometer data used to assess lap events (referred to as starting/ending timestamps and/or split times) and to generate performance metrics as a function thereof. The lap events may be determined when a head event is followed by a push-off event. The head event represents a typical head movement performed by the swimmer prior to pushing off the wall for another lap and the push-off event represents events typically occurring when the swimmer pushes off the wall.

Figure 21:
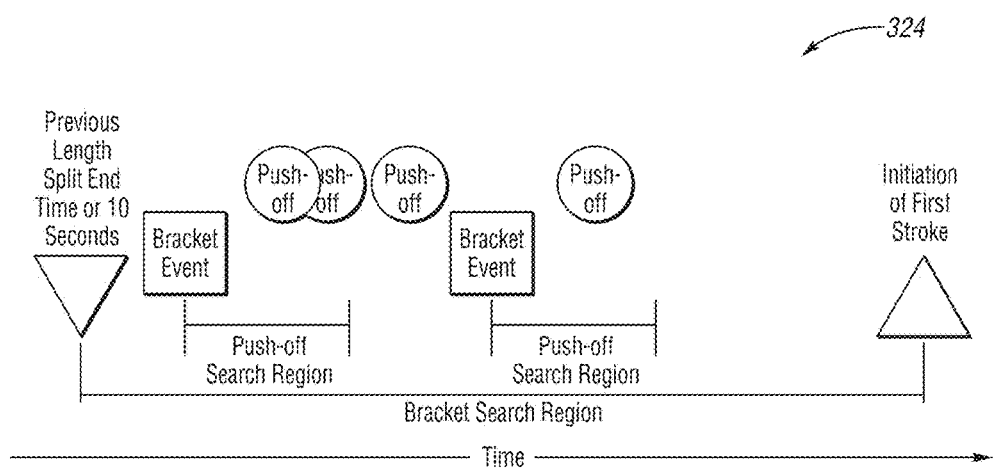
FIG. 21 schematically illustrates determination of lap events in accordance with one non-limiting aspect of the present invention.

FIG. 21 illustrates a schematic 324 useful in understanding the determination of the lap events. The determination may be based on an analysis of previously collected accelerometer data is reviewed after detecting initiation of a first stroke (detectable according to the processes noted above). A bracketed search region defines a prior portion of the accelerometer data being analyzed relative to the first stroke. Within that portion, push-off search regions are set from each identified head event (defined below in more detail). The push-off search regions are then analyzed for occurred of push-off events (defined below in more detail). The illustrated example includes a pair of push-off events occurring within a first bracket search region and a single push-off event occurring within a second bracket search region. One of these push-off events is then determined to mark the end/start of the swum lap.

The head event may include a head dip, a head throw, and a head roll. The head dip may be characterized as a motion where the swimmer's head experiences a rapid transition from face down (or up) to face up (or down) during a flip turn near the end of length for freestyle and back strokes. (The head dip is usually coincidental with the swimmers feet coming out of the water during a flip turn.) The head throw refers to the turning motion of head following a wall touch in breast stroke and butterfly. The head roll refers to the turning of the head during the rollover of the swimmer in back stroke.

The head throw event is generated by low-pass-filtering Y axis acceleration data (from the head device), squaring it (eliminate negative numbers), and finding peaks above a dynamic threshold. The dynamic threshold may be generated by low-pass-filtering the squared Y axis data to eliminate false head throw events from freestyle breathing. The head throw can be falsely determined in the event the swimmer commits any of the following: aggressive side to side breathing in freestyle; aggressive side breathing in butterfly; and aggressive head turning at the wall prior to pushing off the wall, which highlights the need to bracket head event detections relative to the other event (e.g., push-off event) representative of the swimmer actually make a turn. The head roll event may be found by finding the minimum in the low-pass-filtered Z axis within four seconds prior to each head dip, given that the minimum is below a threshold and returns to a level above a threshold within the 4-second window. The head dip may be generated by low-pass-filtering X and Z axis acceleration data (from the head device), subtracting Z from X, and finding a peak above 0.28 G. (Threshold setting of 0.28 G is empirically derived from analysis of the swimmer database to be suitably reliable head dip detection threshold.)

The push-off event used to confirm a preceding head event being representative of a turn may be when the swimmers feet leave the wall and head experiences an abrupt change in velocity (acceleration). Push-off events may be generated by high-pass-filtering X and Z axis data of the head accelerometer data (limb data could also be used), subtracting Z axis from X, and finding peaks above 1.2 G (threshold setting of 1.2 G is empirically derived from the swimmer database such that the most reliable push-off detection is achieved).

The table below list design parameters selected to facilitate further performance metrics contemplated by the present invention and are not intended to limit the scope and contemplation of the present invention.

| | |
|---|---|
| FLIP_TURN_SEARCH_FORWARD | 2 seconds |
| FLIP_TURN_SEARCH_BACKWARD_PERIOD_PERCENT | 200% |
| ROLLOVER_HEAD_DIP_SEARCH_FORWARD | 3 seconds |
| ROLLOVER_SEARCH_FORWARD_PERIOD_PERCENT | 50% |
| BACK_REVERSE_FLIP_OR_TOUCH_TURN_PERIOD_PERCENT | 125% |
| BACK_REVERSE_FLIP_OR_TOUCH_TURN_SERACH_FORWARD | 3 seconds |
| TOUCH_TURN_SEARCH_FORWARD | 4 seconds |
| TURN_TO_PUSH_OFF_SEARCH_FORWARD | 2 seconds |
| FIRST_STROKE_PUSH_OFF_SEARCH_REGION_OFFSET | 1 second |
| PREVIOUS_LENGTH_SPLIT_END_TIME_OFFSET | 0 seconds |

A turn may be used to classify the current length as a first length, mid-length, or last length. This length type classification may be critical for proper length time measurement. Supported turns may include flip turns, backstroke rollover turns, backstroke reverse flip turns, backstroke touch turns (backstroke to breaststroke/freestyle/butterfly transition), and touch turns (two hand touch or single hand touch). If a turn is not found at the end of a length, it may be assumed that the swimmer is finishing a swim and the length will be classified as a last length. If a turn is not found at the beginning of a length, it may be assumed that the swimmer is starting a swim and the length will be classified as either a first length or a single length (see definitions below).

A flip turn may be defined as any head dip event generated within a head dip search region. The head dip search region may be a time window defined from the last detected stroke timestamp minus FLIP_TURN_SEARCH_BACKWARD_PERIOD_PERCENT of the average stroke period (counted as matched and irregular strokes) to the last detected stroke timestamp plus FLIP_TURN_SEARCH_FORWARD seconds. A back stroke rollover turn may be defined as any head roll event generated within the head roll search region. The head roll search region is a time window defined from the last detected stroke timestamp minus two times the average stroke period to the last detected stroke timestamp plus ROLLOVER_SEARCH_FORWARD_PERIOD_PERCENT of the average stroke period. A head dip event must follow the head roll event within a ROLLOVER_HEAD_DIP_SEARCH_FORWARD second window. A backstroke reverse flip turn may be defined as any head dip event generated within the reverse flip turn search region. The reverse flip turn search region is a time window defined from the last detected stroke timestamp minus BACK_REVERSE_FLIP_OR_TOUCH_TURN_PERIOD_PERCENT of the average stroke period to the last detected stroke timestamp plus BACK_REVERSE_FLIP_OR_TOUCH_TURN_SERACH_FORWARD seconds. A backstroke touch turn may be defined as any head throw event generated within the back touch turn search region. The back touch turn search region is a time window defined from the last detected stroke timestamp minus BACK_REVERSE_FLIP_OR_TOUCH_TURN_PERIOD_PERCENT of the average stroke period to the last detected stroke timestamp plus BACK_REVERSE_FLIP_OR_TOUCH_TURN_SERACH_FORWARD seconds. A touch turn may be defined as any head throw event generated within the head throw search region. The head throw search region is a time window defined from the last detected stroke timestamp to the last detected stroke timestamp plus TOUCH_TURN_SEARCH_FORWARD seconds.

A first length is defined as a length that begins without a turn and ends with a turn. The length time during a first length is measured as the difference between the split start timestamp and the split end timestamp. The split start timestamp is the timestamp of the starting push-off of the current length while the split end timestamp is the starting push-off of the next length. The split start time for a first length is found through a search process. Bracketing the push-off event helps in searching for and finding the correct push-off event. Head dip events, and head throw events within the push-off search region are used as bracketing events with priority given to head throw events.

The bracket search region starting timestamp may be the minimum of either:
1. MAX_BREAKOUT_TIME seconds prior to the initiation of the first stroke or
2. The previous length's split end time plus PREVIOUS_LENGTH_SPLIT_END_TIME_OFFSET The bracket search region ending timestamp is the initiation of the first detected stroke minus FIRST_STROKE_PUSH_OFF_SEARCH_REGION_OFFSET seconds.

The push-off search region starting timestamp is defined as the bracket event timestamp. The push off search region ending timestamp is TURN_TO_PUSH_OFF_SEARCH_FORWARD seconds beyond the bracket event timestamp.

The following guidelines may be used to identify the push-off event to be used in marking starting/ending times and calculating performance metrics:
1. If only one push-off event in total is found for all push-off search regions, then that push-off event is used.
2. If multiple push-off search regions include at least one push-off event, the push-off event within the push-off search region having the maximum amplitude push-off event is used as the split start time. If the maximum amplitude push-off event is the same for two or more push-off search regions, then the push-off event within the earliest pair is used as the split start time.
3. If no push-off search region includes a push-off event, then the maximum amplitude push-off event within the bracketed search region is used as the split start time.
4. If multiple push-off events exist with the same amplitude outside of each push-off event search regions, the earliest push-off event is used as the split start time.
5. If no push-off events exist within the bracketed search region, the earliest arm EOL event (earliest activity detected by the SD) is used as the split start time.

A mid-length is defined as a length that begins and ends with a turn. The length time during a mid-length is measured as the difference between the split start timestamp and the split end timestamp. The split start timestamp is the timestamp of the starting push-off of the current length while the split end timestamp is the starting push-off of the next length. For mid-lengths, the split end time of the previous length is used as the split start time of the current length.

A last length is defined as a length that starts with a turn and ends with a finish. The length time during a last length is measured as the time difference between the split start time and the split end time. The split start time is the timestamp of the starting push-off of the current length and the split end time is the timestamp of the last detected stroke plus 50% of the average stroke period. The split end time is the timestamp of the last detected stroke (irregular or matched) plus 50% of the average stroke period to account for a wall touch. If a the final stroke of the length finished coincidentally with a wall touch, the last length split time will be match the traditional definition of split time. Optionally, wireless wall touch sensors may be used to further refine the wall touch/turn calculations.

A single length is defined as a length that starts without a turn and ends with a finish. The length time during a single length is measured as the time difference between the split start time and the split end time. The split start time is the timestamp of the starting push-off of the current length and the split end time is the timestamp of the last detected stroke plus 50% of the average stroke period.

A touch turn at the end of a breaststroke and butterfly length triggers the system to classify the length as a mid-length. If the swimmer swims a butterfly or breaststroke last length and then pushes off to perform a first length within TOUCH_TURN_SEARCH_FORWARD window of the previous lengths last detected stroke (matched or partial), the system will assume the previous length was a mid-length and apply the mid-length split time definition.

Tempo is the average time taken per stroke over a length swam. Tempo is calculated by dividing stroke duration by number of strokes taken. For breaststroke lengths, stroke duration and stroke count are computed based on the head stroke events. The stroke duration is defined as the as the time difference between the timestamp of the last detected match stroke plus 50% of the average stroke period and the first detected match stroke minus 50% of the average stroke period. The number of strokes taken between first and last matched stroke is the sum of matched and irregular strokes and does not include any non-stroke events.

For butterfly lengths, stroke duration and stroke count are computed separately for each limb. The stroke duration and stroke count of each limb is used to compute a tempo for each limb. The tempo of each limb is then averaged together resulting in a final tempo measurement. The stroke duration is defined as the as the time difference between the timestamp of the last detected match stroke plus 50% of the average stroke period and the first detected match stroke minus 50% of the average stroke period. The number of strokes taken between first and last matched stroke is the sum of matched and irregular strokes and does not include any non-stroke events.

For freestyle and backstroke lengths, stroke duration and stroke count are computed after combining the limb stroke events together. The stroke duration and stroke count is then used to compute a final tempo measurement. The stroke duration is defined as the as the time difference between the timestamp of the last detected match stroke plus 50% of the average stroke period and the first detected match stroke minus 50% of the average stroke period. The number of strokes taken between first and last matched stroke is the sum of matched and irregular strokes and does not include any non-stroke events.

Average Distance Per Stroke (DPS) is the length of the pool divided by number of matched plus irregular strokes taken between two consecutive push off markers. Pace is the average speed over a given length. Pace is calculated as the length of the pool divided by the length time measurement.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

What is claimed is:

1. A system for generating performance metrics for a user comprising:
    at least two arm sensors operable to sense user arm movement in an x, y, and z direction and/or at least one head sensor operable to sense user head movement in an x, y, and z direction;
    at least one processor operable to determine performance metrics for the user based on the movement sensed by the arm and/or head sensors;
    wherein at least one performance metric determined by at least one of the at least one processor identifies a number of swimming strokes performed by the user between a starting marker and an ending marker based on movement sensed by at least one of the at least two arm sensors and the at least one head sensor;
    wherein the number of swimming strokes is determined by correlating x, y, and z values sensed while the user swims between the starting and ending markers with a reference stroke selected from the x, y and z values, the x, y, and z values being used by the arm sensors to quantify movement in the corresponding x, y, and z directions; and
        wherein the correlating of the x, y, and z values with the reference stroke includes filtering the x, y, and z values with the reference stroke to identify amplitude peaks, wherein each amplitude peak correlating with at least a P percentage of the reference stroke is counted as one of the number of swimming strokes.

2. The system of claim 1 wherein at least one performance metric determined by at least one of the at least one processor identifies whether left and right arms of the user are performing an alternating swimming stroke based on movement sensed while one of the at least two arm sensors senses user movement of the left arm (referred to as a left arm sensor) and one of the at least two arm sensors senses user movement of the right arm (referred to as a right arm sensor).

3. The system of claim 2 wherein the alternating type swimming stroke is determined in the event a value A is greater than zero, wherein A is determined according to the following formula:

$$A = \S\left(\sum_{i=1}^{N} X_{Ri}X_{Li}\right)^2 + \S\left(\sum_{i=1}^{N} Y_{Ri}Y_{Li}\right)^2 + \S\left(\sum_{i=1}^{N} Z_{Ri}Z_{Li}\right)^2$$

wherein $x_L$, $y_L$, and $z_L$ are values used by the left arm sensor to quantify movement in the corresponding x, y, and z directions;

wherein $x_R$, $y_R$, and $z_R$ are values used by the right arm sensor to quantify movement in the corresponding x, y, and z directions; and wherein § is a positive value of 1 when the corresponding x, y, and z value represents movement the positive direction and a negative value of 1 when the corresponding x, y, and z value represents movement in the negative direction.

4. The system of claim 1 wherein at least one performance metric determined by at least one of the at least one processors identifies whether the head of the user is orientated to reflect performing one of a head-up type and a head-down type swimming stroke based on movement sensed by the at least one head sensor.

5. The system of claim 4 wherein the head-up type swimming stroke is determined in the event a value H is greater than a threshold and the head-down type swimming stoke is determined in the event the value H is less than the threshold, wherein H is determined according to the following formula:

$$H = x_H + z_H;$$

wherein $x_H$ and $z_H$ are values used by the head sensor to quantify movement in the corresponding x and z directions.

6. The system of claim 1 wherein at least one performance metric determined by at least one of the at least one processor identifies whether left and right arms of the user are performing one of a breast stroke and a butterfly swimming stroke based on movement sensed while one of the at least two arm sensors senses user movement of the left arm (referred to as a left arm sensor) and one of the at least two arm sensors senses user movement of the right arm (referred to as a right arm sensor).

7. The system of claim 6 wherein the breast stroke is determined in the event a value $B_a$ is less than a threshold and the butterfly swimming stoke is determined in the event the value $B_a$ is greater than the threshold, wherein $B_a$ is determined according to the following formula:

$$B_a = \text{avg}(x_L + x_R) - \text{avg}(y_L + + y_R)$$

wherein $x_L$ and $y_L$ are values used by the left arm sensor to quantify movement in the corresponding x and y directions; and wherein $x_R$ and $y_R$ are values used by the right arm sensor to quantify movement in the corresponding x and y directions.

8. The system of claim 1 wherein:
    at least one performance metric determined by at least one of the at least one processors identifies whether the head of the user is orientated to reflect performing a crawl type swimming stroke based on movement sensed by the at least one head sensor;
    wherein the crawl swimming stroke is determined in the event a value C is greater than a threshold and not determined in the event the value C is less than the threshold, wherein C is determined according to the following formula:

$$C = y_H / (x_H + z_H);$$

wherein $x_H$, $y_H$, and $z_H$ are values used by the head sensor to quantify movement in the corresponding x, y and z directions.

9. The system of claim 1 wherein:
at least one performance metric determined by at least one of the at least one processor identifies whether left and right arms of the user are performing one of a breast stroke and a butterfly swimming stroke based on movement sensed by the at least one head sensor;
the breast stroke is determined in the event a best-fit of $x_H$, $z_H$, and $z_H$ values used by the head sensor to quantify movement in the corresponding x, y and z directions is with one of a plurality of breast stroke correlation filters; and
the butterfly stroke is determined in the event a best-fit of $x_H$, $z_H$, and $z_H$ values used by the head sensor to quantify movement in the corresponding x, y and z directions is with one of a plurality butterfly stroke correlation filters.

10. The system of claim 1 further comprising:
the P percentage being at least one of 35% and a value corresponding with a lowest amplitude peak within the greatest ⅔ of the amplitude peaks; and
characterizing a first stroke occurring proximate the starting marker to be a matched stroke in the event the corresponding amplitude peak is at least 50% and a last stroke occurring proximate the ending marker to be a matched stroke in the event the corresponding amplitude peak is at least 50%.

11. A system for generating performance metrics for a user comprising:
at least two arm sensors operable to sense user arm movement in an x, y, and z direction and/or at least one head sensor operable to sense user head movement in an x, y, and z direction;
at least one processor operable to determine performance metrics for the user based on the movement sensed by the arm and/or head sensors; and
wherein the number of swimming strokes is determined by correlating x and y values sensed while the user swims between the starting and ending markers with a reference stroke selected from the x and y values, the x and y values being used by the head sensor to quantify movement in the corresponding x and y directions.

12. The system of claim 11 wherein:
the correlating of the x and y values with the reference stroke includes filtering the x and y values with the reference stroke to identify amplitude peaks, wherein each amplitude peak correlating with at least a 35% percentage of the reference stroke is counted as one of the number of swimming strokes; and
at least one of the at least one processor characterizes each of the number of swimming strokes as one of matched and irregular, the matched strokes having amplitude peaks of greater than 79% and each irregular stroke having amplitude peaks of between 79% and 35%.

13. The system of claim 1 wherein:
at least one performance metric determined by at least one of the at least one processors identifies a length of time taken for the user to swim one length of a pool based on movement sensed by the at least one head sensor;
the length of time is counted from a start marker to an end marker, wherein the start and end markers are determined based on movement sensed by the at least one head sensor, the start marker corresponding with movement indicating a first push-off event following a first head event, and the end marker corresponding with movement indicating a second push-off event following a second head event
the first and second head events are determined in the event at least one of the following conditions occur:
(i) a head dip defined as $z_H - x_H > T$, wherein T is a threshold and $x_H$ and $z_H$ are values used by the head sensor to quantify movement in the corresponding x and z directions;
(ii) a head throw defined as $y_H > T_d$, wherein $T_d$ is a dynamic threshold and $y_H$ is a value used by the head sensor to quantify movement in the y direction; and
(iii) a head roll defined as $z_H < T_z$ for S number of seconds before the head dip and $z_H > T_z$ for the S number of seconds following the same head dip, wherein $T_z$ is a threshold and $z_H$ is a value used by the head sensor to quantify movement in the z direction.

14. The system of claim 13 wherein the first and second push-off events are determined in the event $z_H - x_H > T$, wherein T is a threshold and $x_H$ and $z_H$ are values used by the head sensor to quantify movement in the corresponding x and z directions.

15. A method of counting a number of strokes performed by a swimmer based a movement signal generated by at least one of an arm sensor and a head sensor during a swum lap, the method comprising:
identifying a dominate stroke period of the swum lap from the movement signal;
selecting a portion of the movement signal coinciding with one of the dominate periods to be a first reference stroke;
filtering the movement signal based on the first reference stroke to identify a number of potential strokes;
determining the number of strokes based on the identified number of potential strokes;
averaging portions of the movement signal corresponding with two or more of the potential strokes to generate a second reference stroke;
filtering the movement signal based on the second reference stroke to identify a number of final strokes; and
determining the number of strokes to be the number of final strokes having amplitudes greater than a threshold.

16. The method of claim 15 further comprising:
centering phase of the first reference stroke to a phase of a first stroke of the swum length prior to filtering the movement signal to identify the number of potential strokes, including aligning the reference stroke relative a beginning of the first stroke, the beginning of the first stroke being determined with an activity-detection filter that filters a region of the first stoke to identify a transition point from no activity to activity, the transition point being the beginning of the first stroke.

* * * * *